(12) United States Patent
Rogers et al.

(10) Patent No.: US 7,941,687 B2
(45) Date of Patent: May 10, 2011

(54) METHOD AND APPARATUS FOR DIGITAL I/O EXPANDER CHIP WITH MULTI-FUNCTION TIMER CELLS

(75) Inventors: Norman L. Rogers, Miami, FL (US); Monte J. Dalrymple, Livermore, CA (US); Lynn S. Wood, Davis, CA (US); Steve J. Hardy, Woodland, CA (US)

(73) Assignee: Digi International Inc., Minnetonka, MN (US)

( * ) Notice: Subject to any disclaimer, the term of this patent is extended or adjusted under 35 U.S.C. 154(b) by 721 days.

(21) Appl. No.: 11/956,121

(22) Filed: Dec. 13, 2007

(65) Prior Publication Data
US 2009/0154638 A1    Jun. 18, 2009

(51) Int. Cl.
*G06F 1/04* (2006.01)
(52) U.S. Cl. ........... 713/502; 713/600; 377/44; 377/107

(58) Field of Classification Search .................. 713/502, 713/600; 377/107, 44
See application file for complete search history.

(56) References Cited

U.S. PATENT DOCUMENTS

| | | | |
|---|---|---|---|
| 5,535,379 A * | 7/1996 | Koura ............................ | 713/502 |
| RE36,063 E * | 1/1999 | Conner ......................... | 713/600 |
| 6,222,900 B1 * | 4/2001 | Hara ............................. | 377/107 |
| 7,475,269 B2 * | 1/2009 | Padwekar et al. ............. | 713/400 |

* cited by examiner

*Primary Examiner* — Thuan N Du
(74) *Attorney, Agent, or Firm* — Heimlich Law, PC; Alan Heimlich, Esq.

(57) ABSTRACT

A method and apparatus for digital I/O expander chip with multi-function timer cells have been disclosed. A series of match reload registers load a series of match registers which are driven by a master counter. The status of the match registers can be retrieved through ports. The master counter is reloaded on rollover by a count limit register. The master counter has increment/decrement control and the rollover can be used in an interrupt control block to generate an interrupt request.

10 Claims, 45 Drawing Sheets

*← 1400*

| Pin Group | Verilog Name | Pin Name | Direction | Function |
|---|---|---|---|---|
| Hardware | RESETB | /RESET | Input | Master Reset |
| | CLKI | CLKI | Input | Clock In |
| CPU Buses | ADDR[6:0] | A[6:0] | Input | Address Bus |
| | DATA[7:0] | D[7:0] | Bi-directional | Data Bus |
| Status & Control | IOCSB | /IOCS | Input | I/O Chip Select |
| | IORDB | /IORD | Input | I/O Read Enable |
| | IOWRB | /IOWR | Input | I/O Write Enable |
| | INTB | /INT | Output | Interrupt Request |
| Shared | GSYNC | GSYNC | Input | Global Sync |
| I/O Ports | PRT1A - PRT31A<br>PRT1B - PRT31B | PRT1A - PRT31A<br>PRT1B - PRT31B | Input/Output | I/O Port 1 - I/O Port 31 |

FIG. 14

| I/O Address | Selects |
|---|---|
| 0x00 | Master Control Register |
| 0x01 | Master Status Register |
| 0x02-0x03 | Function Block 1 |
| 0x04-0x05 | Function Block 2 |
| 0x06-0x07 | Function Block 3 |
| 0x08-0x09 | Function Block 4 |
| 0x0A-0x0B | Function Block 5 |
| 0x0C-0x0D | Function Block 6 |
| 0x0E-0x0F | Function Block 7 |
| 0x10-0x11 | Function Block 8 |
| 0x12-0x13 | Function Block 9 |
| 0x14-0x15 | Function Block 10 |
| 0x16-0x17 | Function Block 11 |
| 0x18-0x19 | Function Block 12 |
| 0x1A-0x1B | Function Block 13 |
| 0x1C-0x1D | Function Block 14 |
| 0x1E-0x1F | Function Block 15 |
| 0x20-0x21 | Function Block 16 |
| 0x22-0x23 | Function Block 17 |
| 0x24-0x25 | Function Block 18 |
| 0x26-0x27 | Function Block 19 |
| 0x28-0x29 | Function Block 20 |
| 0x2A-0x2B | Function Block 21 |
| 0x2C-0x2D | Function Block 22 |
| 0x2E-0x2F | Function Block 23 |
| 0x30-0x31 | Function Block 24 |
| 0x32-0x33 | Function Block 25 |
| 0x34-0x35 | Function Block 26 |
| 0x36-0x37 | Function Block 27 |
| 0x38-0x39 | Function Block 28 |
| 0x3A-0x3B | Function Block 29 |
| 0x3C-0x3D | Function Block 30 |
| 0x3E-0x3F | Function Block 31 |

| Register Name | Mnemonic | address | R/W | Reset |
|---|---|---|---|---|
| Pointer Register | PR | external | R/W | 00000000 |
| Indirect Register | IR | external | R/W | xxxxxxxx |
| Mode Register | MR | PR = 0x02 | R/W | 00000000 |
| Extended Mode Register | EMR | PR = 0x03 | R/W | 00000000 |
| Status Register | SR | PR = 0x04 | R/W | 00000000 |
| Extended Status Register | ESR | PR = 0x05 | R/W | 00000000 |
| Data Register | DR | PR = 0x06 | R/W | xxxxxxxx |
| Special Data Register | SDR | PR = 0x07 | R/W | xxxxxxxx |
| Counter Prescale Register | CPR | PR = 0x08 | R/W | 00000000 |
| Sync Control Register | SCR | PR = 0x09 | R/W | 00000000 |
| Increment/Inphase/Begin Control Register | ICR | PR = 0x0A | R/W | 00000000 |
| Decrement/Quadrature/End Control Register | DCR | PR = 0x0B | R/W | 00000000 |
| Status A Control Register | SACR | PR = 0x0C | R/W | 00000000 |
| Status B Control Register | SBCR | PR = 0x0D | R/W | 00000000 |
| Port A Control Register | PACR | PR = 0x0E | R/W | 00000000 |
| Port B Control Register | PBCR | PR = 0x0F | R/W | 00000000 |

FIG. 16

| Register Name | Mnemonic | I/O address | R/W | Reset |
|---|---|---|---|---|
| Match A Set 0 Register | MAS0R | PR = 0x10 | R/W | 00000000 |
| Match A Set 1 Register | MAS1R | PR = 0x11 | R/W | 00000000 |
| Match A Set 2 Register | MAS2R | PR = 0x12 | R/W | 00000000 |
| Match A Reset 0 Register | MAR0R | PR = 0x14 | R/W | 00000000 |
| Match A Reset 1 Register | MAR1R | PR = 0x15 | R/W | 00000000 |
| Match A Reset 2 Register | MAR2R | PR = 0x16 | R/W | 00000000 |
| Match B Set 0 Register | MAS0R | PR = 0x18 | R/W | 00000000 |
| Match B Set 1 Register | MAS1R | PR = 0x19 | R/W | 00000000 |
| Match B Set 2 Register | MAS2R | PR = 0x1A | R/W | 00000000 |
| Match B Reset 0 Register | MAR0R | PR = 0x1C | R/W | 00000000 |
| Match B Reset 1 Register | MAR1R | PR = 0x1D | R/W | 00000000 |
| Match B Reset 2 Register | MAR2R | PR = 0x1E | R/W | 00000000 |
| Count Limit 0 Register | CL0R | PR = 0x20 | R/W | xxxxxxxx |
| Count Limit 1 Register | CL1R | PR = 0x21 | R/W | xxxxxxxx |
| Count Limit 2 Register | CL2R | PR = 0x22 | R/W | xxxxxxxx |
| Count Increment Step Register | CISR | PR = 0x24 | R/W | 00000001 |
| Count Decrement Step Register | CDSR | PR = 0x28 | R/W | 00000001 |
| Counter Toggle Register | CTR | PR = 0x2C | R/W | 00000000 |
| Count Begin 0 Register | CB0R | PR = 0x30 | R | xxxxxxxx |
| Count Begin 1 Register | CB1R | PR = 0x31 | R | xxxxxxxx |
| Count Begin 2 Register | CB2R | PR = 0x32 | R | xxxxxxxx |
| Count End 0 Register | CE0R | PR = 0x34 | R | xxxxxxxx |
| Count End 1 Register | CE1R | PR = 0x35 | R | xxxxxxxx |
| Count End 2 Register | CE2R | PR = 0x36 | R | xxxxxxxx |
| Count Value 0 Register | CV0R | PR = 0x38 | R | xxxxxxxx |
| Count Value 1 Register | CV1R | PR = 0x39 | R | xxxxxxxx |
| Count Value 2 Register | CV2R | PR = 0x3A | R | xxxxxxxx |

| Register | Value | Function |
|---|---|---|
| Mode Register | 0x00001000 | Timer mode, continuous. |
| Extended Mode Register | 0x00000000 | Sync not used. |
| Status Register | 0x10000000 | Enable interrupt on counter rollover. |
| Extended Status Register | | not used |
| Data Register | | not used |
| Special Data Register | | not used |
| Counter Prescale Register | user select | Select appropriate prescale value. |
| Sync Control Register | 0x00000000 | not used |
| Increment/Inphase/Begin Control Register | 0x00000000 | not used |
| Decrement/Quadrature/End Control Register | 0x00000000 | not used |
| Status A Control Register | 0x00100110 | Status A set by rollover, reset by Match A. |
| Status B Control Register | 0x00100111 | Status B set by rollover, reset by Match B. |
| Port A Control Register | 0x00001000 | Port A = Status A. |
| Port B Control Register | 0x00001100 | Port B = Status B. |
| Match A Set Registers | 0x00000000 | not used |
| Match A Reset Registers | user select | Count at which to set Port A Low. |
| Match B Set Registers | 0x00000000 | not used |
| Match B Reset Registers | user select | Count at which to set Port B Low. |
| Count Limit Registers | user select | PWM period |
| Count Increment Step Register | 0x00000001 | Increment by one |
| Count Decrement Step Register | 0x00000001 | not used |
| Counter Toggle Register | 0x00000000 | not used |
| Count Begin Registers | | not used |
| Count End Registers | | not used |
| Count Value Registers | | not used |

FIG. 18

| Register | Value | Function |
| --- | --- | --- |
| Mode Register | 0x00001000 | Timer mode, continuous. |
| Extended Mode Register | 0x00000000 | Sync not used. |
| Status Register | 0x10000000 | Enable interrupt on counter rollover. |
| Extended Status Register | | not used |
| Data Register | | not used |
| Special Data Register | | not used |
| Counter Prescale Register | user select | Select appropriate prescale value. |
| Sync Control Register | 0x00000000 | not used |
| Increment/Inphase/Begin Control Register | 0x00000000 | not used |
| Decrement/Quadrature/End Control Register | 0x00000000 | not used |
| Status A Control Register | 0x00110110 | Status A set by Match A Set, reset by Match A Reset. |
| Status B Control Register | 0x00111111 | Status B set by Match B Set, reset by Match B Reset. |
| Port A Control Register | 0x00001000 | Port A = Status A. |
| Port B Control Register | 0x00001100 | Port B = Status B. |
| Match A Set Registers | user select | Count at which to set Port A High. |
| Match A Reset Registers | user select | Count at which to set Port A Low. |
| Match B Set Registers | user select | Count at which to set Port B High. |
| Match B Reset Registers | user select | Count at which to set Port B Low. |
| Count Limit Registers | user select | PPM period |
| Count Increment Step Register | 0x00000001 | Increment by one |
| Count Decrement Step Register | 0x00000001 | not used |
| Counter Toggle Register | 0x00000000 | not used |
| Count Begin Registers | | not used |
| Count End Registers | | not used |
| Count Value Registers | | not used |

FIG. 19

| Register | Value | Function |
|---|---|---|
| Mode Register | 0x00001000 | Timer mode, continuous. |
| Extended Mode Register | 0x00000000 | Sync not used. |
| Status Register | 0x10000000 | Enable interrupt on counter rollover. |
| Extended Status Register | | not used |
| Data Register | | not used |
| Special Data Register | | not used |
| Counter Prescale Register | user select | Select appropriate prescale value. |
| Sync Control Register | 0x00000000 | not used |
| Increment/Inphase/Begin Control Register | 0x00000000 | not used |
| Decrement/Quadrature/End Control Register | 0x00000000 | not used |
| Status A Control Register | 0x00110110 | Status A set by Match A Set, reset by Match A Reset. |
| Status B Control Register | 0x00111111 | Status B set by Match B Set, reset by Match B Reset. |
| Port A Control Register | 0x00001010 | Port A = Status A && Toggle. |
| Port B Control Register | 0x00001110 | Port B = Status B && Toggle. |
| Match A Set Registers | user select | Count at which to set Port A High. |
| Match A Reset Registers | user select | Count at which to set Port A Low. |
| Match B Set Registers | user select | Count at which to set Port B High. |
| Match B Reset Registers | user select | Count at which to set Port B Low. |
| Count Limit Registers | user select | Timer period |
| Count Increment Step Register | 0x00000001 | Increment by one |
| Count Decrement Step Register | 0x00000001 | not used |
| Counter Toggle Register | user select | Select appropriate toggle frequency |
| Count Begin Registers | | not used |
| Count End Registers | | not used |
| Count Value Registers | | not used |

FIG. 20

| Register | Value | Function |
|---|---|---|
| Mode Register | 0x00001000 | Timer mode, continuous. |
| Extended Mode Register | 0x00000001 | Sync resets counter. |
| Status Register | 0x10000000 | Enable interrupt on counter rollover. |
| Extended Status Register | | not used |
| Data Register | | not used |
| Special Data Register | | not used |
| Counter Prescale Register | user select | Select appropriate prescale value. |
| Sync Control Register | 0x00001000 | Use Port A for Sync, rising edge trigger |
| Increment/Inphase/Begin Control Register | 0x00000000 | not used |
| Decrement/Quadrature/End Control Register | 0x00000000 | not used |
| Status A Control Register | 0x00000000 | not used |
| Status B Control Register | 0x00111111 | Status B set by Match B Set, reset by Match B Reset. |
| Port A Control Register | 0x00000000 | Port A input |
| Port B Control Register | 0x00001110 | Port B = Status B. |
| Match A Set Registers | 0x00000000 | not used |
| Match A Reset Registers | 0x00000000 | not used |
| Match B Set Registers | user select | Count at which to set Port B High. |
| Match B Reset Registers | user select | Count at which to set Port B Low. |
| Count Limit Registers | user select | Timer period - longer than timer between Syncs. |
| Count Increment Step Register | 0x00000001 | Increment by one |
| Count Decrement Step Register | 0x00000001 | not used |
| Counter Toggle Register | 0x00000000 | not used |
| Count Begin Registers | | not used |
| Count End Registers | | not used |
| Count Value Registers | | not used |

| Register | Value | Function |
|---|---|---|
| Mode Register | 0x00001000 | Timer mode, continuous. |
| Extended Mode Register | 0x00000000 | not used |
| Status Register | 0x10000000 | Enable interrupt on counter rollover. |
| Extended Status Register |  | not used |
| Data Register | user read | Read for Port state |
| Special Data Register |  | not used |
| Counter Prescale Register | user select | Select appropriate prescale value. |
| Sync Control Register | 0x00000000 | not used |
| Increment/Inphase/Begin Control Register | 0x00000000 | not used |
| Decrement/Quadrature/End Control Register | 0x00000000 | not used |
| Status A Control Register | 0x00000000 | not used |
| Status B Control Register | 0x00000000 | not used |
| Port A Control Register | 0x00000000 | Port A input. |
| Port B Control Register | 0x00000000 | Port B input. |
| Match A Set Registers | 0x00000000 | not used |
| Match A Reset Registers | 0x00000000 | not used |
| Match B Set Registers | 0x00000000 | not used |
| Match B Reset Registers | 0x00000000 | not used |
| Count Limit Registers | user select | Timer period |
| Count Increment Step Register | 0x00000001 | Increment by one |
| Count Decrement Step Register | 0x00000001 | not used |
| Counter Toggle Register | 0x00000000 | not used |
| Count Begin Registers |  | not used |
| Count End Registers |  | not used |
| Count Value Registers |  | not used |

| Register | Value | Function |
|---|---|---|
| Mode Register | 0x00001000 | Timer mode, continuous. |
| Extended Mode Register | 0x00000000 | not used |
| Status Register | 0x10000000 | Enable interrupt on counter rollover. |
| Extended Status Register | | not used |
| Data Register | user write | Write Port Data. |
| Special Data Register | | not used |
| Counter Prescale Register | user select | Select appropriate prescale value. |
| Sync Control Register | 0x00000000 | not used |
| Increment/Inphase/Begin Control Register | 0x00000000 | not used |
| Decrement/Quadrature/End Control Register | 0x00000000 | not used |
| Status A Control Register | 0x00000000 | not used |
| Status B Control Register | 0x00000000 | not used |
| Port A Control Register | 0x00000010 | Port A Data output. |
| Port B Control Register | 0x00000010 | Port B Data output |
| Match A Set Registers | 0x00000000 | not used |
| Match A Reset Registers | 0x00000000 | not used |
| Match B Set Registers | 0x00000000 | not used |
| Match B Reset Registers | 0x00000000 | not used |
| Count Limit Registers | user select | Timer period |
| Count Increment Step Register | 0x00000001 | Increment by one |
| Count Decrement Step Register | 0x00000001 | not used |
| Counter Toggle Register | 0x00000000 | not used |
| Count Begin Registers | | not used |
| Count End Registers | | not used |
| Count Value Registers | | not used |

| Register | Value | Function |
|---|---|---|
| Mode Register | 0x00001010 | Timer mode, runs from Begin condition to End condition. |
| Extended Mode Register | command | Use command to reset counter. |
| Status Register | 0x10000000 | Enable interrupt on counter rollover. |
| Extended Status Register | | not used |
| Data Register | | not used |
| Special Data Register | | not used |
| Counter Prescale Register | user select | Select appropriate prescale value. |
| Sync Control Register | 0x00000000 | not used |
| Increment/Inphase/Begin Control Register | command | Use command to stop counter. |
| Decrement/Quadrature/End Control Register | command | Use command to stop counter. |
| Status A Control Register | 0x00110110 | Status A set by Match A Set, reset by Match A Reset. |
| Status B Control Register | 0x00111111 | Status B set by Match B Set, reset by Match B Reset. |
| Port A Control Register | 0x00001000 | Port A = Status A. |
| Port B Control Register | 0x00001100 | Port B = Status B. |
| Match A Set Registers | user select | Program for delay to set Port A High. |
| Match A Reset Registers | user select | Program for delay to set Port A Low. |
| Match B Set Registers | user select | Program for delay to set Port B High. |
| Match B Reset Registers | user select | Program for delay to set Port B Low. |
| Count Limit Registers | user select | Timer period |
| Count Increment Step Register | 0x00000001 | Increment by one |
| Count Decrement Step Register | 0x00000001 | not used |
| Counter Toggle Register | 0x00000000 | not used |
| Count Begin Registers | | not used |
| Count End Registers | | not used |
| Count Value Registers | | not used |

FIG. 24

| Register | Value | Function |
|---|---|---|
| Mode Register | 0x00001000 | Timer mode, continuous. |
| Extended Mode Register | 0x00000000 | not used |
| Status Register | 0x10110000 | Enable interrupt on counter rollover, Begin and End. |
| Extended Status Register | | not used |
| Data Register | | not used |
| Special Data Register | | not used |
| Counter Prescale Register | user select | Select appropriate prescale value. |
| Sync Control Register | 0x00000000 | not used |
| Increment/Inphase/Begin Control Register | 0x00010000 | Begin on falling edge of Port A |
| Decrement/Quadrature/End Control Register | 0x00010001 | End on falling edge of Port B |
| Status A Control Register | 0x00000000 | not used |
| Status B Control Register | 0x00000000 | not used |
| Port A Control Register | 0x00000000 | Port A input. |
| Port B Control Register | 0x00000000 | Port B input. |
| Match A Set Registers | 0x00000000 | not used |
| Match A Reset Registers | 0x00000000 | not used |
| Match B Set Registers | 0x00000000 | not used |
| Match B Reset Registers | 0x00000000 | not used |
| Count Limit Registers | user select | Timer period |
| Count Increment Step Register | 0x00000001 | Increment by one |
| Count Decrement Step Register | 0x00000001 | not used |
| Counter Toggle Register | 0x00000000 | not used |
| Count Begin Registers | | not used |
| Count End Registers | | not used |
| Count Value Registers | | not used |

FIG. 25

| Register | Value | Function |
| --- | --- | --- |
| Mode Register | 0x00001000 | Timer mode, run from Begin to End. |
| Extended Mode Register | 0x00000000 | Use for command to reset timer. |
| Status Register | 0x00011000 | Enable interrupt on Match A Set and End |
| Extended Status Register | | not used |
| Data Register | | not used |
| Special Data Register | | not used |
| Counter Prescale Register | user select | Select appropriate prescale value. |
| Sync Control Register | 0x00000000 | not used |
| Increment/Inphase/Begin Control Register | 0x00010000 | Begin on falling edge of Port A |
| Decrement/Quadrature/End Control Register | 0x00010001 | End on falling edge of Port B |
| Status A Control Register | 0x00000000 | not used |
| Status B Control Register | 0x00000000 | not used |
| Port A Control Register | 0x00000000 | Port A input. |
| Port B Control Register | 0x00000000 | Port B input. |
| Match A Set Registers | user select | Time delay for delayed interrupt |
| Match A Reset Registers | 0x00000000 | not used |
| Match B Set Registers | 0x00000000 | not used |
| Match B Reset Registers | 0x00000000 | not used |
| Count Limit Registers | user select | Timer period |
| Count Increment Step Register | 0x00000001 | Increment by one |
| Count Decrement Step Register | 0x00000001 | not used |
| Counter Toggle Register | 0x00000000 | not used |
| Count Begin Registers | | not used |
| Count End Registers | | not used |
| Count Value Registers | | not used |

FIG. 26

| Register | Value | Function |
|---|---|---|
| Mode Register | 0x00001010 | Timer mode, runs from Begin to End. |
| Extended Mode Register | 0x00000000 | Use for command to reset timer at start. |
| Status Register | 0x00110000 | Enable interrupt on Begin and End. |
| Extended Status Register | | not used |
| Data Register | | not used |
| Special Data Register | | not used |
| Counter Prescale Register | user select | Select appropriate prescale value. |
| Sync Control Register | 0x00000000 | not used |
| Increment/Inphase/Begin Control Register | 0x00001000 | Begin on rising edge of Port A |
| Decrement/Quadrature/End Control Register | 0x00001001 | End on rising edge of Port B |
| Status A Control Register | 0x00000000 | not used |
| Status B Control Register | 0x00000000 | not used |
| Port A Control Register | 0x00000000 | Port A input. |
| Port B Control Register | 0x00000000 | Port B input. |
| Match A Set Registers | 0x00000000 | not used |
| Match A Reset Registers | 0x00000000 | not used |
| Match B Set Registers | 0x00000000 | not used |
| Match B Reset Registers | 0x00000000 | not used |
| Count Limit Registers | user select | Timer period |
| Count Increment Step Register | 0x00000001 | Increment by one |
| Count Decrement Step Register | 0x00000001 | not used |
| Counter Toggle Register | 0x00000000 | not used |
| Count Begin Registers | user read | Read count where Port A rising edge occurred. |
| Count End Registers | user read | Read count where Port B rising edge occurred. |
| Count Value Registers | | not used |

FIG. 27

| Register | Value | Function |
|---|---|---|
| Mode Register | 0x00001011 | Timer mode, runs during Begin. |
| Extended Mode Register | 0x00000000 | Use for command to reset timer at start. |
| Status Register | 0x00010000 | Enable interrupt on End |
| Extended Status Register | | not used |
| Data Register | | not used |
| Special Data Register | | not used |
| Counter Prescale Register | user select | Select appropriate prescale value. |
| Sync Control Register | 0x00000000 | not used |
| Increment/Inphase/Begin Control Register | 0x00111100 | Begin signalled while Port A & Port B both High. |
| Decrement/Quadrature/End Control Register | 0x00010100 | End signalled on falling edge of (Port A && Port B). |
| Status A Control Register | 0x00000000 | not used |
| Status B Control Register | 0x00000000 | not used |
| Port A Control Register | 0x00000000 | Port A input. |
| Port B Control Register | 0x00000000 | Port B input. |
| Match A Set Registers | 0x00000000 | not used |
| Match A Reset Registers | 0x00000000 | not used |
| Match B Set Registers | 0x00000000 | not used |
| Match B Reset Registers | 0x00000000 | not used |
| Count Limit Registers | user select | Timer period |
| Count Increment Step Register | 0x00000001 | Increment by one |
| Count Decrement Step Register | 0x00000001 | not used |
| Counter Toggle Register | 0x00000000 | not used |
| Count Begin Registers | | not used |
| Count End Registers | | not used |
| Count Value Registers | user read | Read to determine duration of pulse overlap. |

| Register | Value | Function |
|---|---|---|
| Mode Register | 0x00001000 | Timer mode, continuous. |
| Extended Mode Register | 0x00000000 | Use for command to reset timer at start. |
| Status Register | 0x00110000 | Enable interrupt on Begin and End |
| Extended Status Register | | not used |
| Data Register | | not used |
| Special Data Register | | not used |
| Counter Prescale Register | user select | Select appropriate prescale value. |
| Sync Control Register | 0x00000000 | not used |
| Increment/Inphase/Begin Control Register | 0x00001000 | Begin on rising edge of Port A |
| Decrement/Quadrature/End Control Register | 0x00001001 | End on rising edge of Port B |
| Status A Control Register | 0x00000000 | not used |
| Status B Control Register | 0x00000000 | not used |
| Port A Control Register | 0x00000000 | Port A input. |
| Port B Control Register | 0x00000000 | Port B input. |
| Match A Set Registers | 0x00000000 | not used |
| Match A Reset Registers | 0x00000000 | not used |
| Match B Set Registers | 0x00000000 | not used |
| Match B Reset Registers | 0x00000000 | not used |
| Count Limit Registers | user select | Timer period |
| Count Increment Step Register | 0x00000001 | Increment by one |
| Count Decrement Step Register | 0x00000001 | not used |
| Counter Toggle Register | 0x00000000 | not used |
| Count Begin Registers | user read | Read count where Port A rising edge occurred. |
| Count End Registers | user read | Read count where Port B rising edge occurred. |
| Count Value Registers | | not used |

| Register | Value | Function |
|---|---|---|
| Mode Register | 0x00000100 | Counter mode. |
| Extended Mode Register | 0x00000000 | Use for command to reset counter at start. |
| Status Register | 0x00000000 | not used |
| Extended Status Register | | not used |
| Data Register | | not used |
| Special Data Register | | not used |
| Counter Prescale Register | user select | Programmed for appropriate input sampling. |
| Sync Control Register | 0x00000000 | not used |
| Increment/Inphase/Begin Control Register | 0x00001000 | Begin on rising edge of Port A |
| Decrement/Quadrature/End Control Register | 0x00000000 | not used |
| Status A Control Register | 0x00000000 | not used |
| Status B Control Register | 0x00000000 | not used |
| Port A Control Register | 0x00000000 | Port A input. |
| Port B Control Register | 0x00000000 | Port B input. |
| Match A Set Registers | 0x00000000 | not used |
| Match A Reset Registers | 0x00000000 | not used |
| Match B Set Registers | 0x00000000 | not used |
| Match B Reset Registers | 0x00000000 | not used |
| Count Limit Registers | user select | Counter rollover limit. |
| Count Increment Step Register | 0x00000001 | Increment by one |
| Count Decrement Step Register | 0x00000001 | not used |
| Counter Toggle Register | 0x00000000 | not used |
| Count Begin Registers | | |
| Count End Registers | | |
| Count Value Registers | user read | Read for current count of events |

FIG. 30

| Register | Value | Function |
|---|---|---|
| Mode Register | 0x00000100 | Counter mode, count until Match condition. |
| Extended Mode Register | 0x00000000 | Use for command to reset counter at start. |
| Status Register | 0x00001000 | Interrupt on Match A Set condition. |
| Extended Status Register | | not used |
| Data Register | | not used |
| Special Data Register | | not used |
| Counter Prescale Register | user select | Programmed for appropriate input sampling. |
| Sync Control Register | 0x00000000 | not used |
| Increment/Inphase/Begin Control Register | 0x00010101 | Begin on falling edge of (Port A || Port B). |
| Decrement/Quadrature/End Control Register | 0x00000000 | not used |
| Status A Control Register | 0x00000000 | not used |
| Status B Control Register | 0x00000000 | not used |
| Port A Control Register | 0x00000000 | Port A input. |
| Port B Control Register | 0x00000000 | Port B input. |
| Match A Set Registers | use select | Number of event before interrupt. |
| Match A Reset Registers | 0x00000000 | not used |
| Match B Set Registers | 0x00000000 | not used |
| Match B Reset Registers | 0x00000000 | not used |
| Count Limit Registers | user select | Counter rollover limit. |
| Count Increment Step Register | 0x00000001 | Increment by one |
| Count Decrement Step Register | 0x00000001 | not used |
| Counter Toggle Register | 0x00000000 | not used |
| Count Begin Registers | | |
| Count End Registers | | |
| Count Value Registers | user read | Read for current count of events |

FIG. 31

| Register | Value | Function |
| --- | --- | --- |
| Mode Register | 0x00000110 | Counter mode, up/down. |
| Extended Mode Register | 0x00000001 | Reset counter on Sync signal. |
| Status Register | 0x11000000 | Interrupt on increment to 0 or decrement from 0. |
| Extended Status Register | | not used |
| Data Register | | not used |
| Special Data Register | | not used |
| Counter Prescale Register | user select | Programmed for appropriate input sampling. |
| Sync Control Register | 0x00000000 | not used |
| Increment/Inphase/Begin Control Register | 0x00001100 | Begin on rising edge of (Port A && Port B) |
| Decrement/Quadrature/End Control Register | 0x00001101 | End on rising edge of )Port A && !Port B). |
| Status A Control Register | 0x00000000 | not used |
| Status B Control Register | 0x00000000 | not used |
| Port A Control Register | 0x00000000 | Port A = input. |
| Port B Control Register | 0x00000000 | Port B = input. |
| Match A Set Registers | 0x00000000 | not used |
| Match A Reset Registers | 0x00000000 | not used |
| Match B Set Registers | 0x00000000 | not used |
| Match B Reset Registers | 0x00000000 | not used |
| Count Limit Registers | user select | Counter rollover limit. |
| Count Increment Step Register | 0x00000001 | Increment by one. |
| Count Decrement Step Register | 0x00000001 | Decrement by one. |
| Counter Toggle Register | 0x00000000 | not used |
| Count Begin Registers | | not used |
| Count End Registers | | not used |
| Count Value Registers | user read | Read to determine current count. |

FIG. 32

| Register | Value | Function |
|---|---|---|
| Mode Register | 0x00000110 | Counter mode, up/down. |
| Extended Mode Register | 0x00000001 | Reset counter on Sync signal. |
| Status Register | 0x11000000 | Interrupt on increment to 0 or decrement from 0. |
| Extended Status Register | | not used |
| Data Register | | not used |
| Special Data Register | | not used |
| Counter Prescale Register | user select | Select appropriate prescale value. |
| Sync Control Register | 0x00010010 | Falling edge of Port A of next higher FB is Sync. |
| Increment/Inphase/Begin Control Register | 0x00100000 | Port A is Inphase signal. |
| Decrement/Quadrature/End Control Register | 0x00100001 | Port B is Quadrature signal. |
| Status A Control Register | 0x00000000 | not used |
| Status B Control Register | 0x00000000 | not used |
| Port A Control Register | 0x00000000 | Port A = input. |
| Port B Control Register | 0x00000000 | Port B = input. |
| Match A Set Registers | 0x00000000 | not used |
| Match A Reset Registers | 0x00000000 | not used |
| Match B Set Registers | 0x00000000 | not used |
| Match B Reset Registers | 0x00000000 | not used |
| Count Limit Registers | user select | Counter period. |
| Count Increment Step Register | 0x00000001 | Increment by one. |
| Count Decrement Step Register | 0x00000001 | Decrement by one. |
| Counter Toggle Register | 0x00000000 | not used |
| Count Begin Registers | | not used |
| Count End Registers | | not used |
| Count Value Registers | | not used |

FIG. 33

| Master Control Register | | (MCR) (External Address = 0x00) |
|---|---|---|
| Bit(s) | Value | Description |
| 7 | 0 | No effect on the device. |
| | 1 | Reset the entire device. |
| 6:1 | | These bits are ignored during writes and always return zero when read. |
| 0 | 0 | Disable interrupts for this device. |
| | 1 | Enable interrupts for this device. |

FIG. 34

| Master Status Register | | (MSR) (External Address = 0x01) |
|---|---|---|
| Bit(s) | Value | Description |
| 7 | 0 | There is no interrupt pending in the device. |
| | 1 | There is an interrup pending in the device. This bit is just the logical-OR of bits 4:0 in this register. |
| 6:5 | | These bits are reserved and will always be read as zeros. |
| 4:0 | | These five bits encode the channel number of the highest-priority channel with a pending interrupt. When no interrupts are pending these bits are all zeros. |

| Pointer Register | | (PR)    (External Address = 0x0) |
|---|---|---|
| Bit(s) | Value | Description |
| 7 | 0 | Disable pointer auto-increment. |
|  | 1 | Enable pointer auto-increment. Pointer automatically increments after each IR access. |
| 6 |  | This bit is ignored during writes and always returns zero when read. |
| 5:0 |  | These six bits hold the function block register address for indirect access. |

| Indirect Register | | (IR)    (External Address = 0x1) |
|---|---|---|
| Bit(s) | Value | Description |
| 7:0 | read | Data from the register addressed by the PR is returned. |
|  | write | Data is written to the register addressed by the PR. |

| Mode Register | | (MR) (Pointer = 0x02) |
|---|---|---|
| Bit(s) | Value | Description |
| 7 | 0 | No effect on Function Block. This bit always reads as zero. |
| | 1 | Master Reset. Reset counter to all zeros condiition, clear all pending interrupts, clear Status A and Status B signals. |
| 6:4 | | These bits are reserved and should not be used. These bits always read as zeros. |
| 3:0 | 0000 | Disable Function Block. |
| | 0001 | |
| | 0010 | |
| | 0011 | |
| | 0100 | Enable Counter mode. Count forever, on Increment/Inphase/Begin signal. |
| | 0101 | Enable Counter mode. Count until any Match condition, on Increment/Inphase/Begin signal. |
| | 0110 | Enable Counter mode. Count up on Increment/Inphase/Begin and count down on Decrement/Quadrature/End. |
| | 0111 | |
| | 1000 | Enable Timer mode. Counter runs continuously, clocked by output of prescaler. |
| | 1001 | Enable Timer mode. Counter runs continuously, clocked by output of prescaler, until the End condition. |
| | 1010 | Enable Timer mode. Counter runs from Begin condition until End condition, clocked by the output of the prescaler. |
| | 1011 | Enable Timer mode. Counter counts continuously during Begin condition, clocked by the output of the prescaler. |

| Status Register | | (SR)　　　　　(Pointer = 0x03) |
|---|---|---|
| Bit(s) | Value | Description (Counter and Timer modes only) |
| 7:0 | 0 | Disable the interrupt for the corresponding status condition. |
| write | 1 | Enable the interrupt for the corresponding status condition. |
| 7 | 0 | No Counter Rollover (using Increment step) interrupt condition pending. |
| read | 1 | Counter Rollover (using Increment step) interrupt condition pending. |
| 6 | 0 | No Counter Rollover (using Decrement step) interrupt condition pending. |
| read | 1 | Counter Rollover (using Decrement step) interrupt condition pending. |
| 5 | 0 | No Increment/Inphase/Begin interrupt condition pending. |
| read | 1 | Increment/Inphase/Begin interrupt condition pending. |
| 4 | 0 | No Decrement/Quadrature/End interrupt condition pending. |
| read | 1 | Decrement/Quadrature/End interrupt condition pending. |
| 3 | 0 | No Match A Set interrupt condition pending. |
| read | 1 | Match A Set interrupt condition pending. |
| 2 | 0 | No Match A Reset interrupt condition pending. |
| read | 1 | Match A Reset interrupt condition pending. |
| 1 | 0 | No Match B Set interrupt condition pending. |
| read | 1 | Match B Set interrupt condition pending. |
| 0 | 0 | No Match B Reset interrupt condition pending. |
| read | 1 | Match B Reset interrupt condition pending. |

| Counter Toggle Register | | (CTR)　　　　(Pointer = 0x04) |
|---|---|---|
| Bit(s) | Value | Description |
| 7:0 | 0 | Deselect the corresponding bit of the Counter as the toggle signal. |
| | 1 | Select the corresponding bit of the Counter as the Toggle signal. For 50% duty cycle select one bit. For 25% duty cycle select two adjacent bits, and so on. The actual Toggle signal is generated as Toggle = &(~CTR | Counter[7:0]). |

FIG. 40

| Sync Control Register (SCR) | | (Pointer = 0x05~09) |
|---|---|---|
| Bit(s) | Value | Description |
| 7 | 0 | No operation. This bit always reads as zero. |
| | 1 | Force a Sync signal. |
| 6:5 | | These bits are reserved and should not be used. These bits always read as zero. |
| 4:3 | 00 | Disable Sync signal, without generating an edge. |
| | 01 | Sync signalled on rising edge. |
| | 10 | Sync signalled on falling edge. |
| | 11 | Sync signalled on either edge. |
| 2:0 | 000 | Use Port A for Sync signal. |
| | 001 | Use Port B for Sync signal. |
| | 010 | Use Port A of next higher Function Block for Sync signal. |
| | 011 | Use Port B of next lower Function Block for Sync Signal. |
| | 100 | This bit combination is reserved and should not be used. |
| | 101 | This bit combination is reserved and should not be used. |
| | 110 | This bit combination is reserved and should not be used. |
| | 111 | Use Global Sync for Sync signal. |

FIG. 41

| Increment/Inphase/Begin Control Register | | (ICR) (Pointer = 0x06) |
|---|---|---|
| Bit(s) | Value | Description |
| 7 | 0 | No operation. This bit always reads as zero. |
| | 1 | Force an Increment/Begin signal. |
| 6 | | This bit is reserved and should not be used. This bit always reads as zero. |
| 5:3 | 000 | Disable Increment/Inphase/Begin signal, without generating an edge. |
| | 001 | Increment/Inphase/Begin signalled on rising edge. |
| | 010 | Increment/Inphase/Begin signalled on falling edge. |
| | 011 | Increment/Inphase/Begin signalled on either edge. |
| | 100 | Increment/Inphase/Begin signalled on 10 -> 11 -> 01 -> 00 -> 10 transitions. |
| | 101 | This bit combination is reserved and should not be used. |
| | 110 | Increment/Inphase/Begin signalled while Low. |
| | 111 | Increment/Inphase/Begin signalled while High. |
| 2:0 | 000 | Select Port A. |
| | 001 | Select Port B. |
| | 010 | Select Port A of next higher Function Block. |
| | 011 | Select Port B of next lower Function Block. |
| | 100 | Select (Port A && Port B). |
| | 101 | Select (Port A && !Port B). |
| | 110 | Select (Port A || Port Bit B). |
| | 111 | Select (Port A ^ Port Bit B). |

| Decrement/Quadrature/End Control Register (DCR) | | (Pointer = 0x07) |
|---|---|---|
| Bit(s) | Value | Description |
| 7 | 0 | No operation. This bit always reads as zero. |
| | 1 | Force a Decrement/End signal. |
| 6 | | This bit is reserved and should not be used. This bit always reads as zero. |
| 5:3 | 000 | Disable Decrement/Quadrature/End signal, without generating an edge. |
| | 001 | Decrement/Quadrature/End signalled on rising edge. |
| | 010 | Decrement/Quadrature/End signalled on falling edge. |
| | 011 | Decrement/Quadrature/End signalled on either edge. |
| | 100 | Decrement/Quadrature/End signalled on 01 -> 11 -> 10 -> 00 -> 01 transitions. |
| | 101 | This bit combination is reserved and should not be used. |
| | 110 | Decrement/Quadrature/End signalled while Low. |
| | 111 | Decrement/Quadrature/End signalled while High. |
| 2:0 | 000 | Select Port A. |
| | 001 | Select Port B. |
| | 010 | Select Port A of next higher Function Block. |
| | 011 | Select Port B of next lower Function Block. |
| | 100 | Select (Port A && Port B). |
| | 101 | Select (Port A && !Port B). |
| | 110 | Select (Port A || Port B). |
| | 111 | Select (Port A ^ Port B). |

FIG. 43

| Status x Control Register | | (S0CR) (Pointer = 0x08) |
|---|---|---|
| | | (S1CR) (Pointer = 0x09) |
| | | (S2CR) (Pointer = 0x0A) |
| | | (S3CR) (Pointer = 0x0B) |
| Bit(s) | Value | Description |
| 7:6 | | These bits are reserved and should not be used. |
| 5:3 | 000 | Status x not set by internal conditions. |
| | 001 | Status x set by Counter rollover (decrement). |
| | 010 | Status x set by Counter rollover (increment). |
| | 011 | Status x set by Sync signal. |
| | 100 | Status x set by Match 0 condition. |
| | 101 | Status x set by Match 1 condition. |
| | 110 | Status x set by Match 2 condition. |
| | 111 | Status x set by Match 3 condition. |
| 2:0 | 000 | Status x not reset by internal conditions. |
| | 001 | Status x reset by Counter rollover (decrement). |
| | 010 | Status x reset by Counter rollover (increment). |
| | 011 | Status x reset by Sync signal. |
| | 100 | Status x reset by Match 0 condition. |
| | 101 | Status x reset by Match 1 condition. |
| | 110 | Status x reset by Match 2 condition. |
| | 111 | Status x reset by Match 3 condition. |

| Port x Control Register | | (P0CR) (Pointer = 0x0C) | |
|---|---|---|---|
| | | (P1CR) (Pointer = 0x0D) | |
| | | (P2CR) (Pointer = 0x0E) | |
| | | (P3CR) (Pointer = 0x0F) | |
| Bit(s) | Value | Description | |
| 7:4 | read | These bits return the current state of Port[3:0]. | |
| 7:4 | write | These bits store the output data for Port[3:0]. | |
| 3 | | This bit is reserved and should not be used. | |
| 2:0 | 000 | Port bit is an input. | |
| | 001 | This bit combination is reserved and should not be used. | |
| | 010 | Port bit is an output: Status x & Toggle. | |
| | 011 | Port bit is an output: Status x | |
| | 100 | Port bit is an output: use appropriate bit of PxCR. Sequence through P0CR-P1CR-P2CR-P3CR, changing on each counter (increment) rollover. | |
| | 101 | Port bit is an output: use appropriate bit of P3CR | |
| | 110 | Port bit is an output: Low | |
| | 111 | Port bit is an output: High | |

| Count Limit LSB Register | | (CLLR) | (Address = 0x18) |
|---|---|---|---|
| Count Limit MSB Register | | (CLMR) | (Address = 0x19) |
| Bit(s) | Value | Description | |
| 7:0 | | When the next count is greater than the value held in this register the counter will be reset to all zeros. The value in this register is loaded into a holding register for the comparison each time the counter is reloaded to allow modification of the limit value during the current count cycle. | |

| Count Begin LSB Register | (CBLR) | (Pointer = 0x1A) |||
| Count Begin MSB Register | (CBMR) | (Pointer = 0x1B) |||
| Bit(s) | Value | Description |
|---|---|---|
| 7:0 | | These registers return the count that was latched by the Begin condition. The value that is read is guaranteed to be stable by freezing the read data while the pointer is pointing to either of these registers. This latching function is independent of the latches controlled by the Begin condition. |

| Count End LSB Register | (CELR) | (Pointer = 0x1C) |||
| Count End MSB Register | (CEMR) | (Pointer = 0x1D) |||
| Bit(s) | Value | Description |
|---|---|---|
| 7:0 | read | These registers hold the count that was latched by the End condition. The value that is read is guaranteed to be stable by freezing the read data while the pointer is pointing to either of these registers. This latching function is independent of the latches controlled by the End condition. |

| Count Value LSB Register | (CVLR) | (Address = 0x1E) |||
| Count Value MSB Register | (CVMR) | (Address = 0x1F) |||
| Bit(s) | Value | Description |
|---|---|---|
| 7:0 | | The current count is returned. The value that is read is guaranteed to be stable by freezing the read data while the pointer is pointing to either of these registers. This implies that the pointer must be modified to point at another register to allow a new current count to be read. |

FIG. 50

METHOD AND APPARATUS FOR DIGITAL I/O EXPANDER CHIP WITH MULTI-FUNCTION TIMER CELLS

FIELD OF THE INVENTION

The present invention pertains to circuitry. More particularly, the present invention relates to a method and apparatus for digital I/O (Input/Output) expander chip with multi-function timer cells.

BACKGROUND OF THE INVENTION

In the field of electronics, circuitry is used to define, control, and direct operations, processing, sensing, etc. Often microcontroller designs require additional I/O which may mean moving to a larger microcontroller or adding additional logic (discreet, CPLD (configurable programmable logic device), FPGA (field programmable gate array), etc.). If working on an existing product, moving to a larger microcontroller could involve substantial reengineering of the product. Simple I/O may not be that difficult to add to a circuit, but if the need is for more complex functions than a microcontroller normally provides, then much more complex circuitry is needed to add the desired function to the design. This presents a problem. Getting additional advanced I/O functionality may involve additional circuitry or the large time and cost investment needed for CPLD or FPGA designs. This presents a problem.

BRIEF DESCRIPTION OF THE DRAWINGS

The invention is illustrated by way of example and not limitation in the figures of the accompanying drawings in which:

FIGS. 14-50 illustrate various embodiments of the present invention.

DETAILED DESCRIPTION

Figure 3:
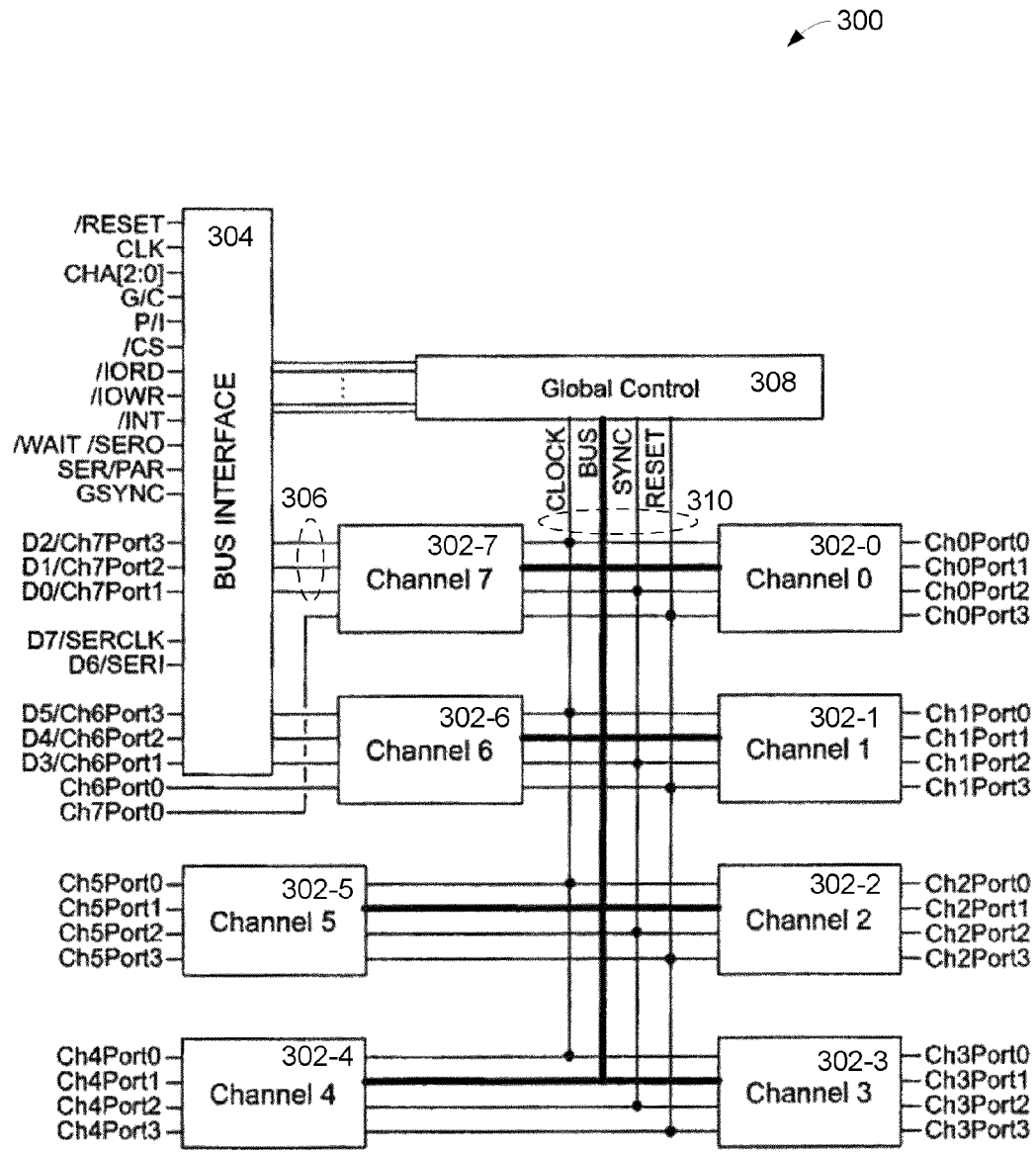
FIG. 3 illustrates one embodiment of the invention showing structure of the internals of a chip.

In one embodiment of the present invention, the I/O expander chip described here allows the addition of advanced I/O through a simple serial or parallel interface. Since this is a synchronous serial port it can even be easily implemented on general purpose ports of the microcontroller if a synchronous serial or SPI (Serial Peripheral Interface) port is not available. If a serial interface is not desired, it can be added through a bus based parallel interface as well. This interface also makes stand alone remotely controllable and readable I/O very simple to design, with advanced features. The I/O expander with multiple timer cells solves the I/O problem through a single integrated circuit which has multiple user configurable timer cells which are connected to small groups of I/O pins on the device. The timer cells can be configured to perform a variety of functions which include, but are not limited to:

parallel I/O
timer-synchronized outputs
input capture timing
pulse width/frequency measurement
event up/down counter
quadrature decoder
pulse width/position modulation
charge pump driver signal generation
TRIAC driver signal generation FIG. 3 illustrates, generally at 300, one embodiment of the invention as might be implemented in a single chip ASIC (Application Specific Integrated Circuit). The basic structure of the internals of the chip is shown in FIG. 3. In several of the diagrams the timer cell (e.g. 302-0 to 302-7) may be referred to as a Channel. The terms timer cell, timer channel and channel are synonymous in the scope of this document. The basic structure of the chip is to have a bus interface block 304 that can handle either parallel or serial communications to an outside processor or system. The bus interface may take over some timer channel pins (e.g. 306) when run in parallel mode, which is the case, as illustrated, in this diagram. If the channel port is used by the bus interface, it is disconnected from the timer cell and any timer functions on that pin are not usable. In one embodiment, the bus interface (304) can not be changed during operation. The second major block is the global control block (308). This block contains the master clock prescaler, global synchronization control, reset control and channel bus logic. Signals from this block (310) are shared by all timer cells (e.g. 302-0 to 302-7). This internal control block and channel bus means that any number of timer cells could be used in other implementations of the invention, it is not limited to the eight channels shown in this diagram.

Figure 4:
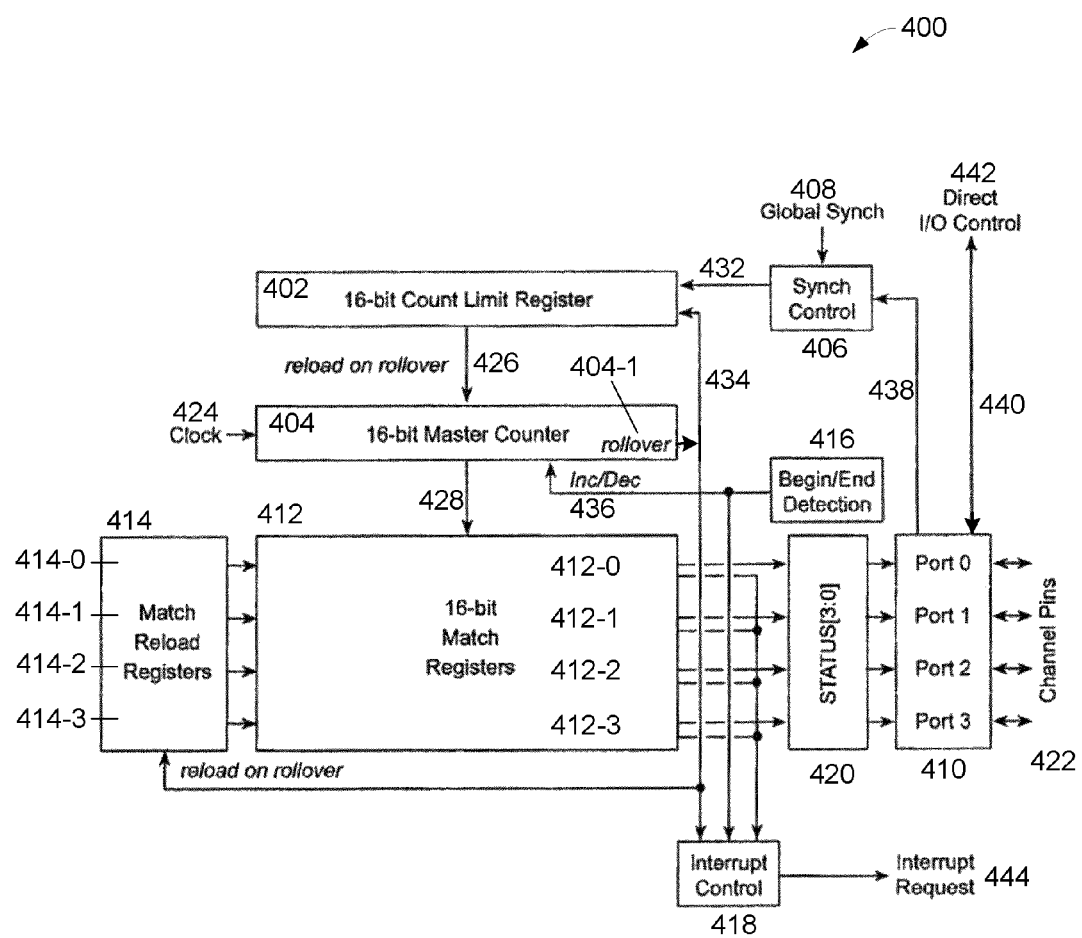
FIG. 4 illustrates one embodiment of the present invention showing a channel block in more detail.

FIG. 4 illustrates, generally at 400, one embodiment of the present invention showing a channel block 400 (such as that shown in FIG. 3 at 302-2) in more detail. The channel level block diagram shows the major functions contained in each timer cell. The Count Limit Register 402 and the Master Counter 404 combine to create a settable rollover frequency allowing further tailoring of the time base within each timer cell. This is connected to the Synch Control 406 allowing synchronization of timer periods to either the Global Synch 408 or an independent synch signal given on one of the channel ports 410. The Master Counter 404 is linked to four Match Registers (at 412, 412-0 to 412-3) and four Match Reload Registers (at 414, 414-0 to 414-3). The Master Counter Rollover (404-1), Begin/End Detection Logic 416 and Match Logic on each of the Match Registers (412-0 to 412-3) all feed into the Interrupt Control block 418 to allow selectable interrupts 444 on any of these conditions. There are also four programmable Status registers (420) that control the state of any output pins 422, which can be set by several types of internal events such as matching the Match Register 412. The Port registers 410 can be set directly, or get their value from the Status registers 420. 424 represents the clock input to Master Counter 404. 426 represents the output of the Count Limit Register 402 as input by the Master Counter 404. 428 represents the output of Master Counter 404 as input to Match Registers 412. 436 represents the output of Begin/End Detection Logic 416 as input to Master Counter 404. 434 represents the rollover 404-1 output of Master Counter 404 as it is input to the Count Limit Register 402, the Match Reload Registers 414, and the Interrupt Control 418. 432 represents the output of the Synch Control 406 as it is input to the Count Limit Register 402. 438 represents the output of Port registers 410 as it is input to the Synch Control 406. 440 represents the I/O interface between Direct I/O Control 442 and Port registers 410.

This highly configurable arrangement of counters, registers, synchronization, and decision logic makes up the very versatile timer cell 400.

Because of the versatile nature of the timer cell there are many possible configurations. Various embodiments and configuration will be illustrated to show some of the functions.

Figure 5:
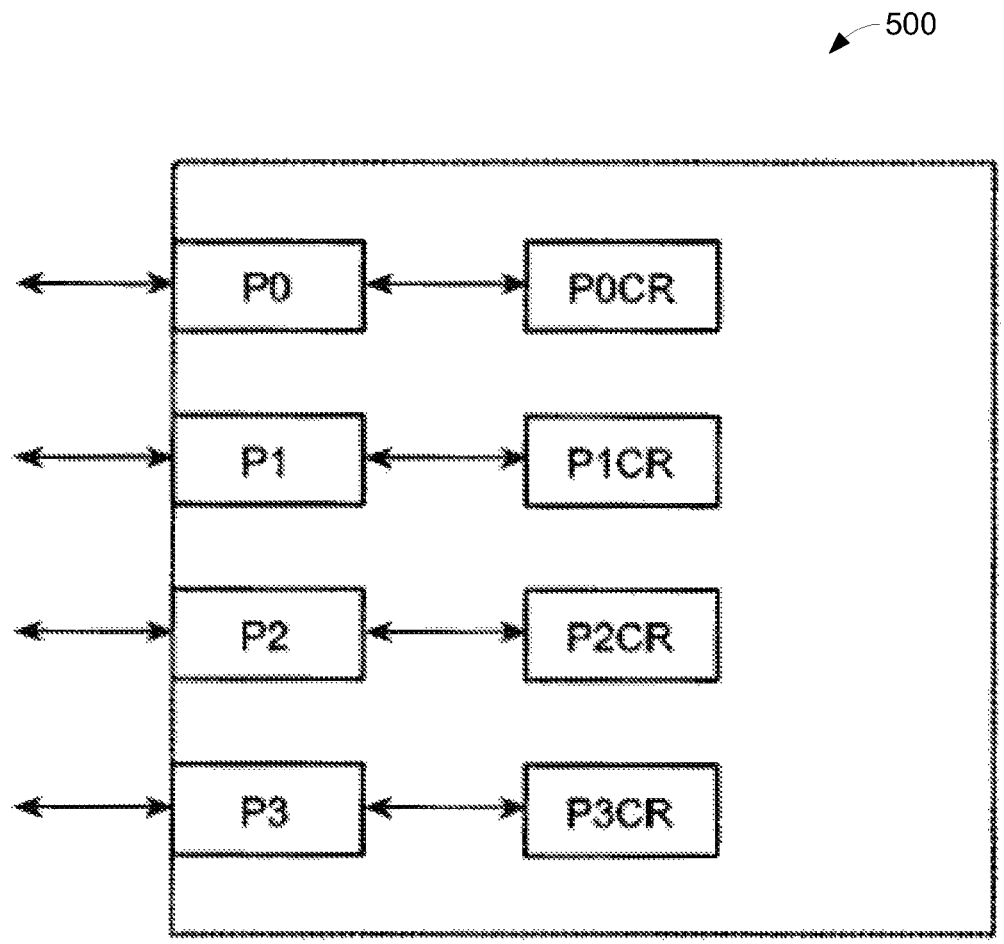
FIG. 5 illustrates one embodiment of the present invention showing port registers.

Now let's look at the different methods that the timer cell can be configured for creating the different functions listed previously. Since many of these functions require specific use of the Master Counter and limit and match registers, some functions cannot be combined within a single timer cell. Having multiple timer cells allows different functions to be used within the same chip, of course, just not within the same cell or channel. One function which can be mixed with any other functions is General Purpose I/O, which is accomplished through direct access to the Port registers (e.g. P0CR to P3CR) themselves and requires no timer features. This is shown in FIG. 5, generally at 500, and is the simplest form of I/O. The invention does allow for synchronized outputs, which allows a sequence of stored transitions to be triggered by timer rollover events.

Figure 6:
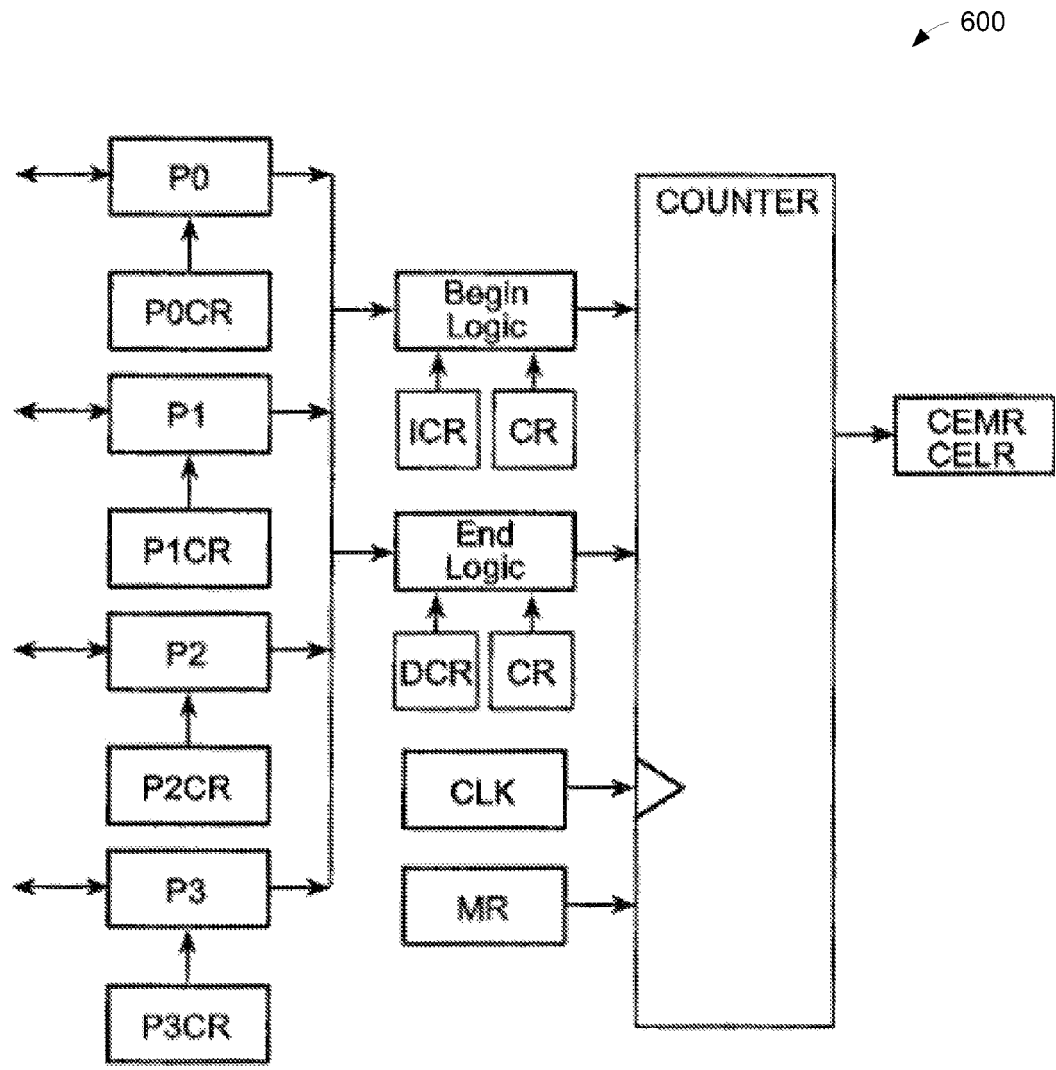
FIG. 6 illustrates one embodiment of the invention showing use of a timer cell to allow input capture.

FIG. 6 illustrates, generally at 600, one embodiment of the invention showing use of a timer cell to allow input capture. In this mode, there is both begin and end logic that allows the counter to be started on an event (edge or level) on any port and the same for ending and capturing the count. Interrupts can be triggered on either start or end events. You can also start the counter through software and look for just the end condition. This can be used for pulse width timing, timing between two different signals, etc.

Figure 7:
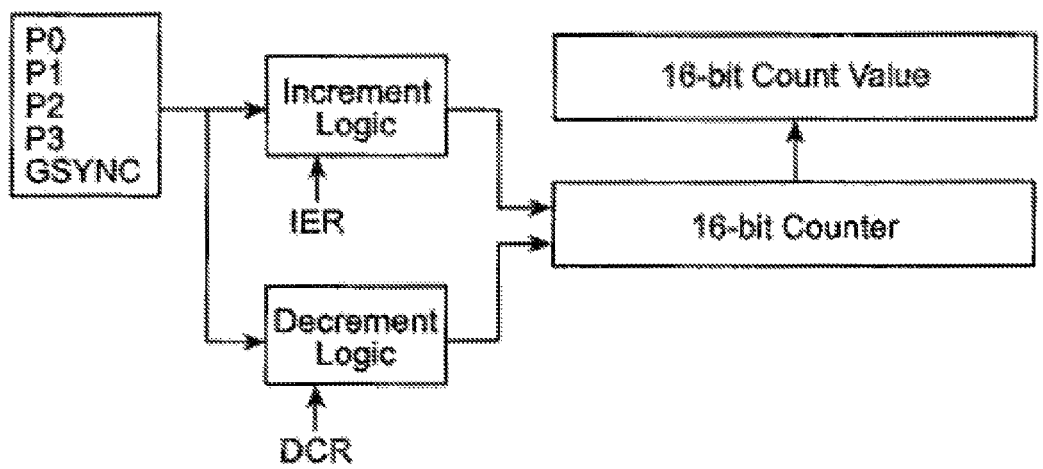
FIG. 7 illustrates one embodiment of the invention showing a quadrature decoder.
Figure 8:
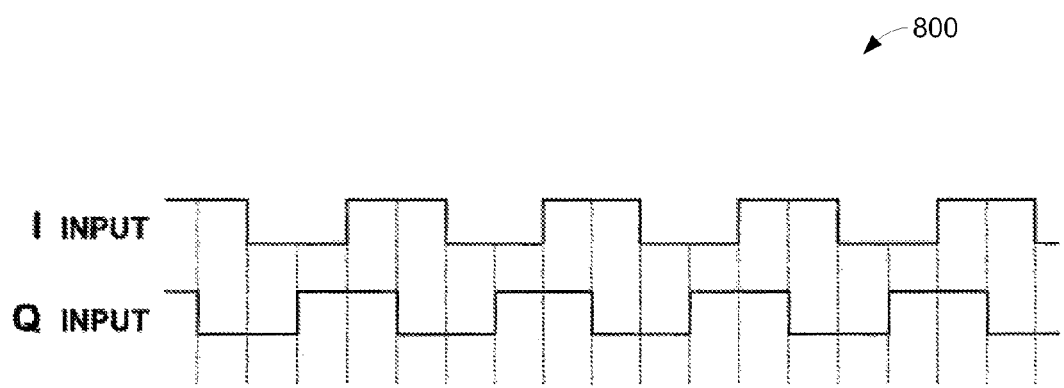
FIG. 8 illustrates encoder signals when the count is incrementing.
Figure 9:
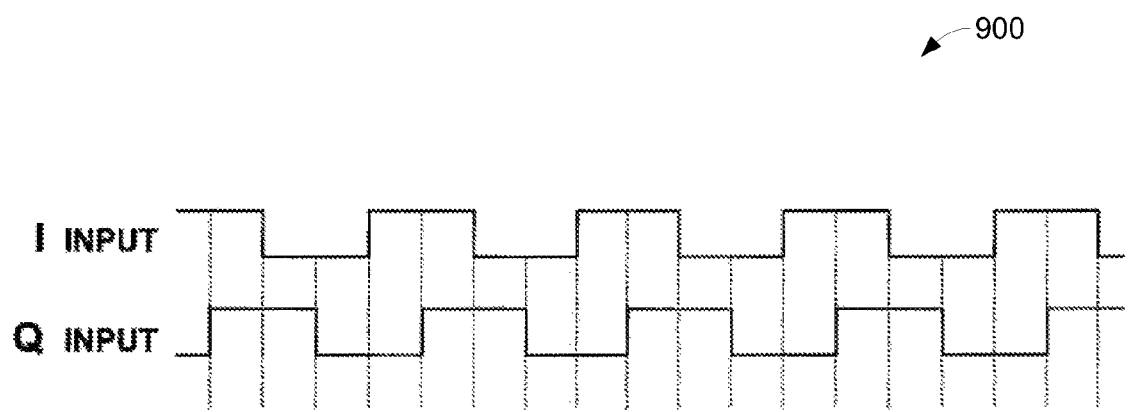
FIG. 9 illustrates encoder signals when the count is decrementing.

FIG. 7 illustrates, generally at 700, one embodiment of the invention showing a quadrature decoder. Quadrature decoders allow interpretation of signals from shaft position encoders. The output of such an encoder is two pulse trains which carry information on both movement and direction. FIG. 8 shows, generally at 800, the encoder signals when the count is incrementing. FIG. 9 shows, generally at 900, the encoder signals when the count is decrementing. You can see that the Q input signal is inverted between the two. The sequence of rising and failing edges from the two signals is used to detect the direction of the movement, whereas the number of pulses quantifies the amount of movement. When set up for quadrature decoding, both increment and decrement logic is enabled and used to control the 16-bit counter. The count value register is used to store the counter reading to allow it to be read without affecting or being affected by count activity.

Figure 10:
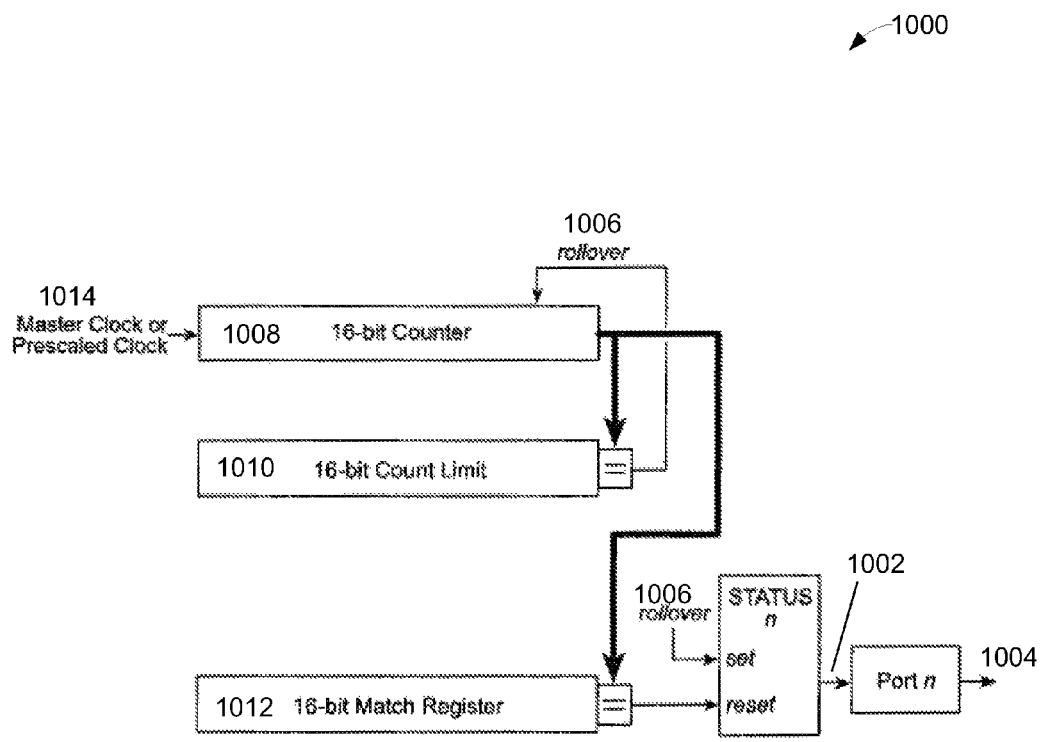
FIG. 10 illustrates one embodiment of the invention showing use of a timer cell for PWM (Pulse Width Modulation)

FIG. 10 illustrates, generally at 1000, one embodiment of the invention showing use of a timer cell for PWM (Pulse Width Modulation). The output of the Status logic 1002 is echoed on the Port Pin 1004. The Status bit (output at 1002) is set by a rollover event 1006, which happens when the counter 1008 reaches the value in the 16-bit Count Limit register 1010 and another clock is received. This event also resets the 16-bit counter 1008. The Status bit is cleared 1012 when the counter 1008 reaches the value in the 16-bit Match register 1014. So the ratio between the Count Limit (at 1010) and the Match register (at 1014) sets the duty cycle of the signal created by the PWM. The Count Limit register 1010 and the frequency of the master or prescaled clock 1016 set the period of the PWM waveform. The Global Synch line (as shown, for example, in FIG. 4 at 408) can be used to synchronize the PWM waveform with a zero crossing signal to create triac control signals.

Figure 11:
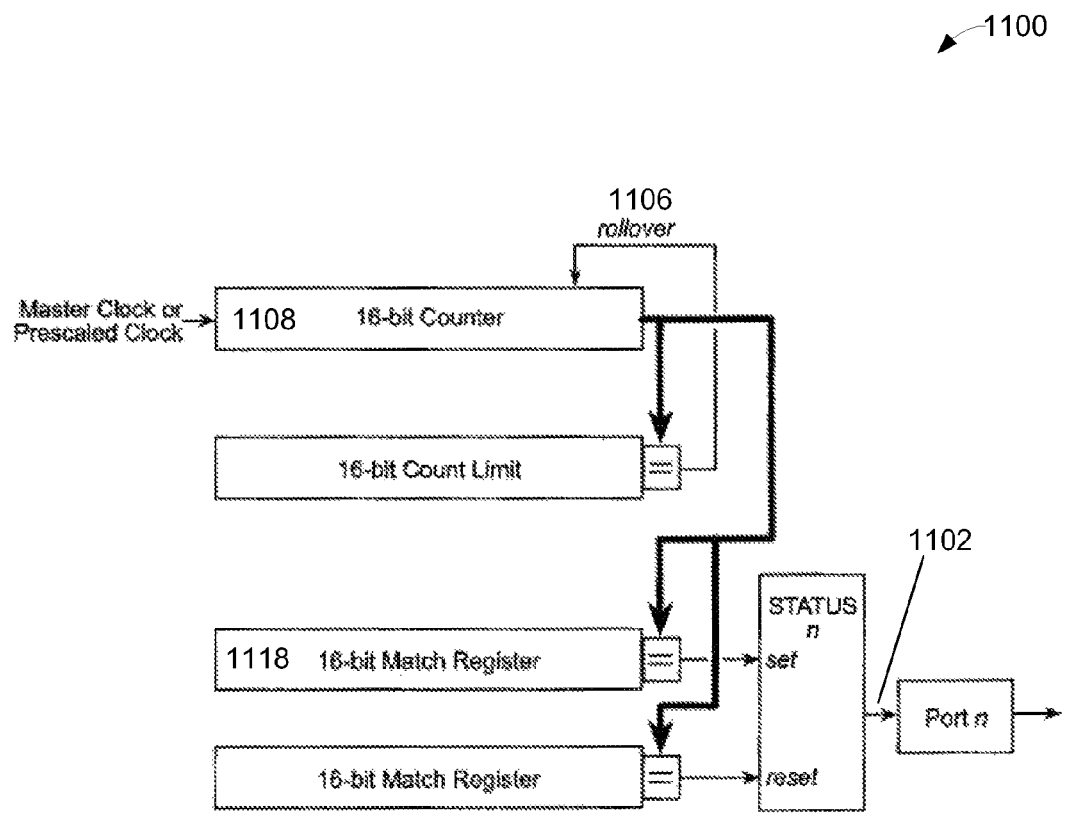
FIG. 11 illustrates one embodiment of the invention showing use of a timer cell for PPM (Pulse Position Modulator)
Figure 12:
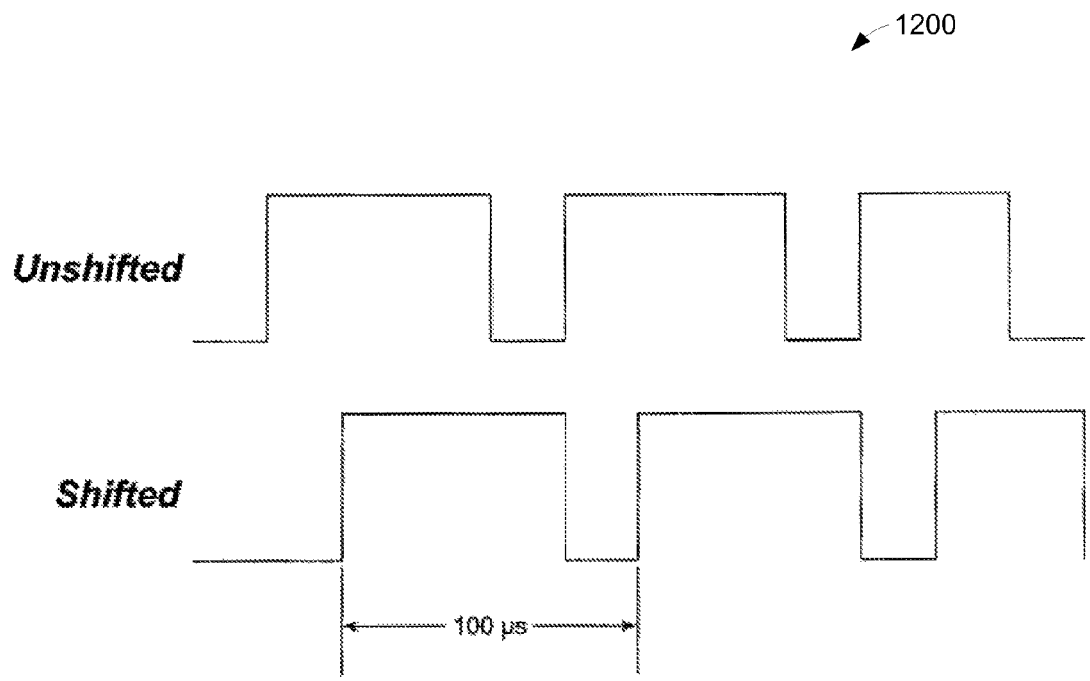
FIG. 12 illustrates unshifted and shifted signals.

FIG. 11 illustrates, generally at 1100, one embodiment of the invention showing use of a timer cell for PPM (Pulse Position Modulator). Pulse Position Modulator (PPM) is accomplished by adding another Match register 1118 to determine when to set the Status bit (output at 1102). This uncouples this event from the rollover 1106 of the Counter 1108. This allows the variation of the phase shift between two or more PPM signals by either working from the same counter, or by using Synch logic to synchronize the counters in multiple timer cells. FIG. 12 illustrates, generally at 1200, unshifted and shifted signals.

Figure 13:
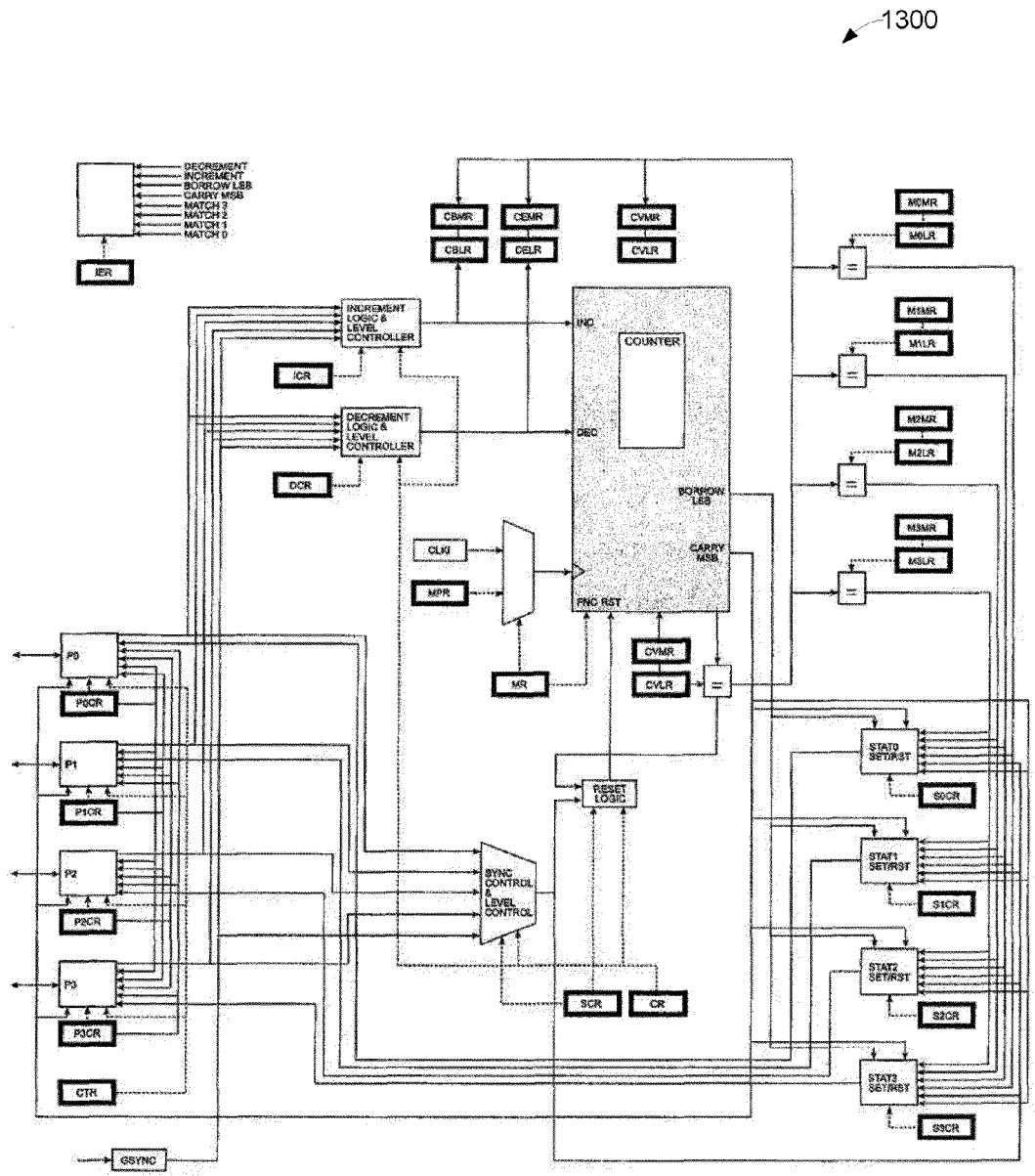
FIG. 13 illustrates one embodiment of the invention showing the overall layout of a timer cell, including control registers, match registers and buffer registers.

FIG. 13 illustrates, generally at 1300, one embodiment of the invention showing the overall layout of a timer cell and logic connections.

In one embodiment of the invention, all of the previous examples of circuit functionality can be implemented with the proper settings placed in the proper registers. All of this functionality is controlled dynamically through these registers and functionality of any pin can be changed at any time.

In one embodiment of the invention, in addition to the many timer based functions already listed, the device can apply H-bridge protection to adjacent port pins (e.g. 1-2 or 3-4) for protection of push-pull or H-bridge type drivers. This protection may be used when adjacent ports are used to drive the 2 opposing sides of the driver. In this situation, you want to guarantee that both sides are never enabled at the same time. The device, in one embodiment, has built in protection which, when enabled, prevents both pins in the pairing to be on or high at the same time. This eliminates the need for any external protection logic when using these types of drivers.

What is to be appreciated is that an embodiment of the present invention, allows versatile I/O expansion, and advanced I/O functionality. In one embodiment the device is a single chip which only needs an external clock source to operate and has the ability to be reconfigured through software, thereby possibly eliminating redesigns when a port pin may require different functionality.

FIGS. 14-50 illustrate various embodiments of the present invention.

FIG. 14 illustrates, generally at 1400, one embodiment of the invention showing pins on the device, along with the direction of the pin and the pin function.

In one embodiment the invention is designed to be connected to either a processor data bus or to a processor I/O bus without any glue logic.

FIG. 15 illustrates, generally at 1500, one embodiment of the invention showing external I/O addresses and how an external address bus selects internal registers according to the table in FIG. 15. Each Function Block is accessed indirectly through just two external I/O addresses.

FIG. 16, generally at 1600, and FIG. 17, generally at 1700, illustrate embodiments of the invention showing internal I/O addresses. Each Function Block is controlled through a set of registers, listed in FIG. 16. Only the Pointer Register (PR) and the Indirect Register (IR) are directly accessible from the external interface. All other registers within the Function Block are accessed indirectly, by first writing the register address to the PR and then reading or writing the IR. Reading or writing the IR can automatically increment the PR to address the next sequential register in the Function Block. This feature can reduce the number of address writes required when accessing multi-byte values.

All unlisted addresses are reserved and should not be used. Writes to reserved addresses are ignored. Reads from reserved addresses will always return all zeros.

In one embodiment the invention contains some number of identical function blocks. Although these function blocks can operate in a number of different modes, the core of each function block is a 16-bit counter that is clocked by an eight-bit prescaler. This prescaler is in turn clocked by the master clock input for the device. This master counter is accompanied by a number of registers that are updated with control register values each time the counter rolls over. This buffering allows the control registers to be updated with values to be used during the next count cycle, during the current count cycle. The registers that are buffered in this way are the 16-bit reload register and the four 16-bit match registers.

The four 16-bit match registers each generate an output pulse when the count is greater than or equal to the value programmed in the match registers. Thus they are useful only when the counter is incrementing. These pulses can be used to set or reset either of the two outputs from the function block.

The 16-bit limit register determines when the counter will be reloaded. When incrementing, if the next count will be greater than the contents of the limit register the counter is reloaded. When incrementing by one the counter is restarted from the all-zero condition. When incrementing by other than one, the counter is reloaded with the value consistent with counting modulo the contents of the reload register, plus one. In those cases where the counter is decrementing the counter is reloaded when the next count will be less than zero. The counter is reloaded with the limit register value when decrementing by one. When decrementing by other than one, the counter is reloaded with the value consistent with counting modulo the contents of the reload register, plus one.

Some of the different operating modes that are possible are described in more detail below.

FIG. 18 illustrates, generally at 1800, one embodiment of the invention configured as a pulse width modulator. To use a function block as a two-output Pulse Width Modulator, select Timer Mode, with the PWM period loaded into the Count Limit Registers. The two Status bits will be the PWM outputs. Select the count rollover condition to set the Status bits and load the Match x LSB and Match x MSB Registers with the count at which the Status bits should be cleared. Variable-frequency PWM operation is obtained by selecting to set the Status bits upon matching one set of Match Registers and reset the Status bits upon matching another set of Match Registers. Multiple function blocks can be synchronized by using the Sync signal to initialize the different counters.

FIG. 19 illustrates, generally at 1900, one embodiment of the invention configured as a pulse position modulator. To use a function block as a two-output Pulse Position Modulator, select Timer Mode, with the pulse period loaded into the Count Limit Registers. The two Status bits will be the PPM outputs. Set the pulse starting time using one set of Match x LSB and MSB Registers and the pulse ending times using another set of Match x LSB and MSB Registers. Variable-frequency PPM operation is obtained by reprogramming the Count Limit Registers. Multiple function blocks can be synchronized by using the Sync signal to initialize the different counters.

FIG. 20 illustrates, generally at 2000, one embodiment of the invention configured as a high side charge pump driver. A High Side Charge Pump Driver requires what is essentially a PWM signal that pulses (to do the charge pumping) rather than staying at one level. This is accomplished by programming the function block identically to either the PWM or PPM case. Rather than outputting the Status bits directly, choose as output the Status Bit ANDed with the Toggle signal. The toggle signal is programmed via the Counter Toggle Register, and selects one stage of the timer as output. Two outputs are possible from each function block, or one pin can be used as an input to synchronize the timing of the charge pump output.

FIG. 21 illustrates, generally at 2100, one embodiment of the invention configured as triac driver or time-delayed output. Driving a TRIAC requires an input signal that can be used to determine the zero-crossing point of an AC waveform. The TRIAC drive is then activated at the zero-crossing point and deactivated at some later time. If the Sync signal corresponds to the zero-crossing, this is just like a PWM, while if the Sync signal is offset from the zero-crossing it is just like the PPM. Either the global Sync signal or one of the Function Block pins can be used for the Sync signal. Note that two function blocks may be used together to create three TRIAC drive signals sharing one Sync signal.

FIG. 22 illustrates, generally at 2200, one embodiment of the invention configured as a simple parallel input port. Each function block can be used as a simple input port. The timer can be used to generate periodic interrupts separately.

FIG. 23 illustrates, generally at 2300, one embodiment of the invention configured as a simple parallel input port. Each function block can be used as a simple output port, with or without open-drain outputs. The timer can be used to generate periodic interrupts separately.

FIG. 24 illustrates, generally at 2400, one embodiment of the invention configured to have timer-synchronized outputs. Creating timer-synchronized outputs requires setting up the Status signals for output and then controlling the timer operation with the processor. So, rather than just writing the data to be output at a later time, you use the set and reset controls for the Status signals to create the outputs. Then the timer can be started and stopped by the processor.

FIG. 25 illustrates, generally at 2500, one embodiment of the invention configured to have simple interrupt inputs. Both port pins may be used as simple interrupt inputs. As in the case of simple port inputs, the timer is still available for periodic interrupts. Interrupts can be generated on either input transition, or both transitions. Note that because the Begin and End conditions can be generated from combinations of the Port inputs it is possible to generate inputs based on these combinations of Port inputs.

FIG. 26 illustrates, generally at 2600, one embodiment of the invention configured to have an immediate and a delayed interrupt. The timer in the function block can be used to generated a delayed interrupt. In the example shown in the table at FIG. 26, one interrupt is immediate and the other is delayed by a programmed time period. Delayed interrupts can be used for things such as switch debouncing.

FIG. 27 illustrates, generally at 2700, one embodiment of the invention configured for input capture. The input capture function is useful for determining the relative timing between two pulses or edges, or determining the determining the timing of an external signal relative to a software-generated Sync signal. In the example shown in the table at FIG. 27, the function block is set up to measure the time between the rising edge of Port A and the rising edge of Port B. Note that either Port rising edge may occur first.

FIG. 28 illustrates, generally at 2800, one embodiment of the invention configured for pulse width measurement. Measuring the width of a pulse is accomplished by using the pulse to gate the timer. This technique can also be used to measure the overlap of two signals, by appropriate selection of the Begin condition. The example in FIG. 28 measures the time that both Port inputs are High simultaneously.

FIG. 29 illustrates, generally at 2900, one embodiment of the invention configured for measuring frequency. Measuring the frequency of an input signal is essentially identical to the Input Capture function, except that the processor must compare the latched count values from two successive Begin or End conditions. Measuring the frequency of both Port inputs simultaneously is possible.

FIG. 30 illustrates, generally at 3000, one embodiment of the invention configured as a simple event counter. A simple event counter counts the number of specified conditions on the Port pins. An event can be as simple as an edge on a Port pin or some combination of the state of both Port pins. The example in FIG. 30 counts rising edges on Port A.

FIG. 31 illustrates, generally at 3100, one embodiment of the invention configured as an event counter interrupting on the Nth event. Sometimes it is useful to count external events and interrupt after some programmed number has occurred. The example below counts the number of times that both Port A and Port B have been Low at the same time and generates an interrupt after some number of these events have occurred.

FIG. 32 illustrates, generally at 3200, one embodiment of the invention configured as an up/down counter. The function block can be configured to count up on one event and count down on another event. The count signals can be either "count up" and "count down" or "direction" and "count", depending on the programming of the Begin and End conditions. The example in FIG. 32 uses a rising edge on Port A as the "count up" signal and the rising edge on Port B as the "count down" signal.

FIG. 33 illustrates, generally at 3300, one embodiment of the invention configured as a quadrature decoder. A quadrature decoder is a specialized up/down counter, where it is the phase relationship of the two inputs that determines the count direction. Note that the counter can be an arbitrary length, although common quadrature wheels have either 500 or 512 steps. This would require count limits of either 0x7CF (1999) or 0x1FF (2047), as each step leads to a count of four. The Sync signal can be used as an optional Index Pulse.

FIG. 34, generally at 3400, and FIG. 35, generally at 3500, illustrate embodiments of the invention having master register bit assignments that define various operations. Two external addresses are used for registers that provide global control and status for the device. The status register allows quick determination of the highest priority pending interrupt, while the control register can globally enable and disable interrupts and reset the device. FIG. 34 illustrates a Master Control Register (MCR) at an external address of 0x00. FIG. 35 illustrates a Master Status Register (MSR) at an external address of 0x01.

FIG. 36 through FIG. 50 illustrate embodiments of the invention having function block register bit assignments that define various operations. This section describes all of the register bit assignments and operation for each of the identical Function Blocks. Only the Pointer Register (PR) and the Indirect Register (IR) are directly addressable via the external address bus. The PR can optionally automatically increment the pointer address after each IR access. This allows faster access of multi-byte quantities to or from the registers. This feature can be disabled to allow continuous polling or data transfer.

FIG. 36 illustrates, generally at 3600, one embodiment of the invention showing the Pointer Register (PR) at external address 0x00.

FIG. 37 illustrates, generally at 3700, one embodiment of the invention showing the Indirect Register (IR) at external address 0x01.

FIG. 38 illustrates, generally at 3800, one embodiment of the invention showing the Mode Register (MR) at pointer address 0x02. That is the pointer address as defined in, for example, FIG. 36 bits 5:0 points are set to 0x02 to access the Mode Register and a read or write to, for example, the Indirect Register in FIG. 37 accesses the Mode Register.

FIG. 39 illustrates, generally at 3900, one embodiment of the invention showing the Status Register (SR) at pointer address 0x03 for counter and timer modes.

FIG. 40 illustrates, generally at 4000, one embodiment of the invention showing the Counter Toggle Register (CTR) at pointer address 0x04 for counter duty cycle modes.

FIG. 41 illustrates, generally at 4100, one embodiment of the invention showing the Sync Control Register (SCR) at pointer address 0x05.

FIG. 42 illustrates, generally at 4200, one embodiment of the invention showing the Increment/Inphase/Begin Control Register (ICR) at pointer address 0x06.

FIG. 43 illustrates, generally at 4300, one embodiment of the invention showing the Decrement/Quadrature/End Control Register (DCR) at pointer address 0x07.

FIG. 44 illustrates, generally at 4400, one embodiment of the invention showing the Status x Control Registers, where x=0, 1, 2, and 3. S0CR is at Pointer=0x08, S1CR is at Pointer=0x09, S2CR is at Pointer=0x0A, and S3CR is at Pointer=0x0B.

FIG. 45 illustrates, generally at 4500, one embodiment of the invention showing the Port x Control Registers, where x=0, 1, 2, and 3. P0CR is at Pointer=0x0C, P1 CR is at Pointer=0x0D, P2CR is at Pointer=0x0E, and P3CR is at Pointer=0x0F.

Figure 46:

FIG. 46 illustrates, generally at 4600, one embodiment of the invention showing the Match x LSB Registers (MxLR) and Match x MSB Registers (MxMR) where x denotes the set and where x=0, 1, 2, and 3. M0LR is at Pointer=0x10, M1LR is at Pointer=0x12, M2LR is at Pointer=0x14, M3LR is at Pointer=0x16, and M0MR is at Pointer=0x11, M1MR is at Pointer=0x13, M2MR is at Pointer=0x 5, M3MR is at Pointer=0x17.

FIG. 47 illustrates, generally at 4700, one embodiment of the invention showing the Count Limit x Register (CLxR) where x denotes the set (LSB or MSB). For example, at pointer address 0x18 for CLLR and address 0x19 for CLMR.

FIG. 48 illustrates, generally at 4800, one embodiment of the invention showing the Count Begin x Register (CBxR) where x denotes the set (LSB denoted by L, MSB denoted by M). For example, at pointer address 0x1A for CBLR and address 0x1B for CBMR.

FIG. 49 illustrates, generally at 4900, one embodiment of the invention showing the Count End x Register (CExR) where x denotes the set. For example, at pointer address 0x1C for CELR and address 0x1D for CEMR.

FIG. 50 illustrates, generally at 5000, one embodiment of the invention showing the Count Value x Register (CVxR) where x denotes the set. For example, at pointer address 0x1E for CVLR and address 0x1F for CVMR.

While various embodiments have been described with respect to embodiments of the current invention being configured via, for example, a microprocessor, the invention is not so limited. For example, in one embodiment, a product containing embodiments of the invention may be shipped to an end user site, connected to a network that is connected to the Internet, and then automatically configured by automatically downloading configuration information from the Internet. In this embodiment, the configuration information loaded into the registers may be defined by a manufacturer. In this way, the product can install itself, including the necessary configuration, and may subsequently periodically check the web site or other locations for configuration updates.

One of skill in the art will appreciate that the techniques described may be extended to handle a larger or smaller number of configurable cells.

Thus a method and apparatus for digital I/O expander chip with multi-function timer cells have been described.

Figure 1:
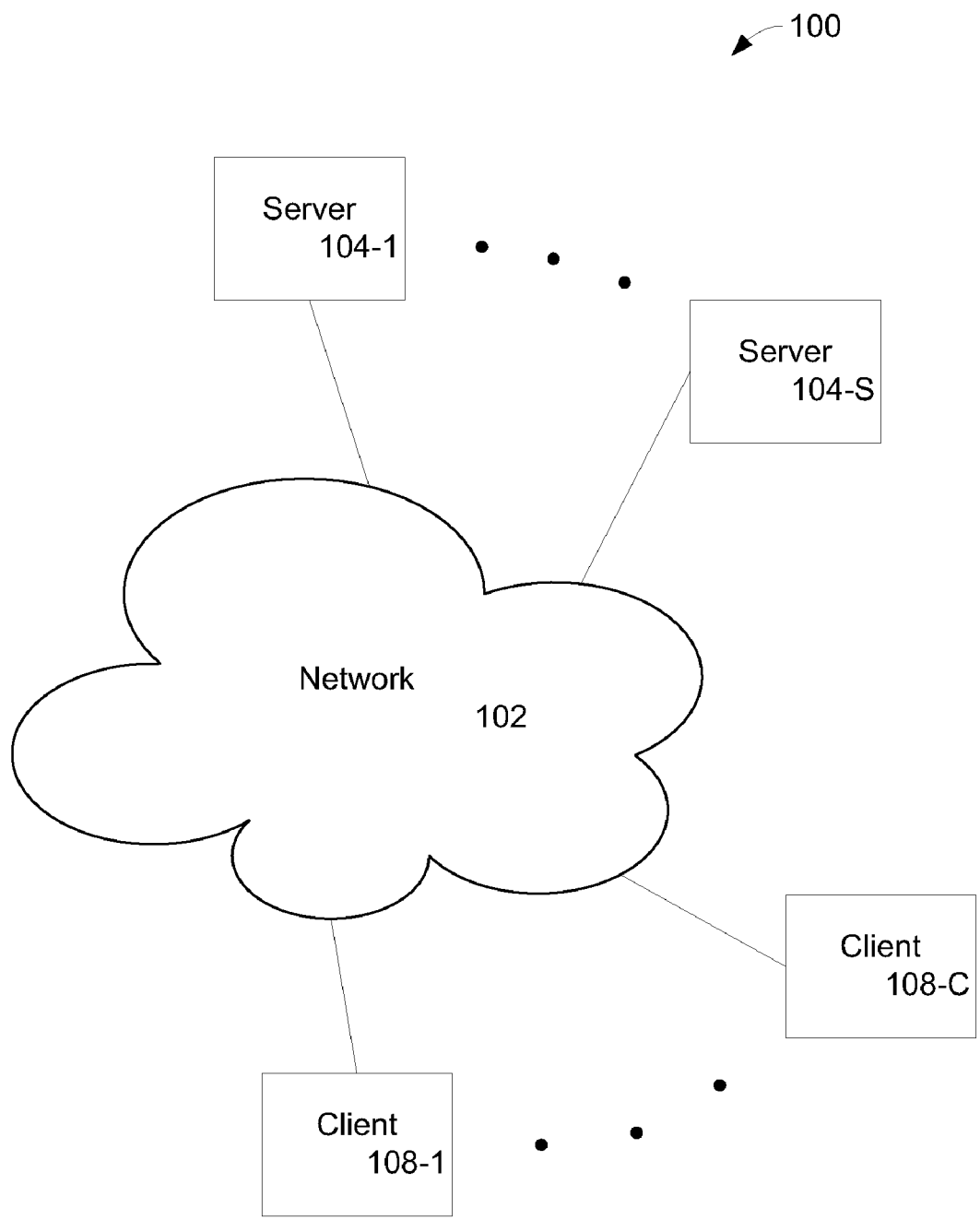
FIG. 1 illustrates a network environment in which the method and apparatus of the invention may be implemented.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
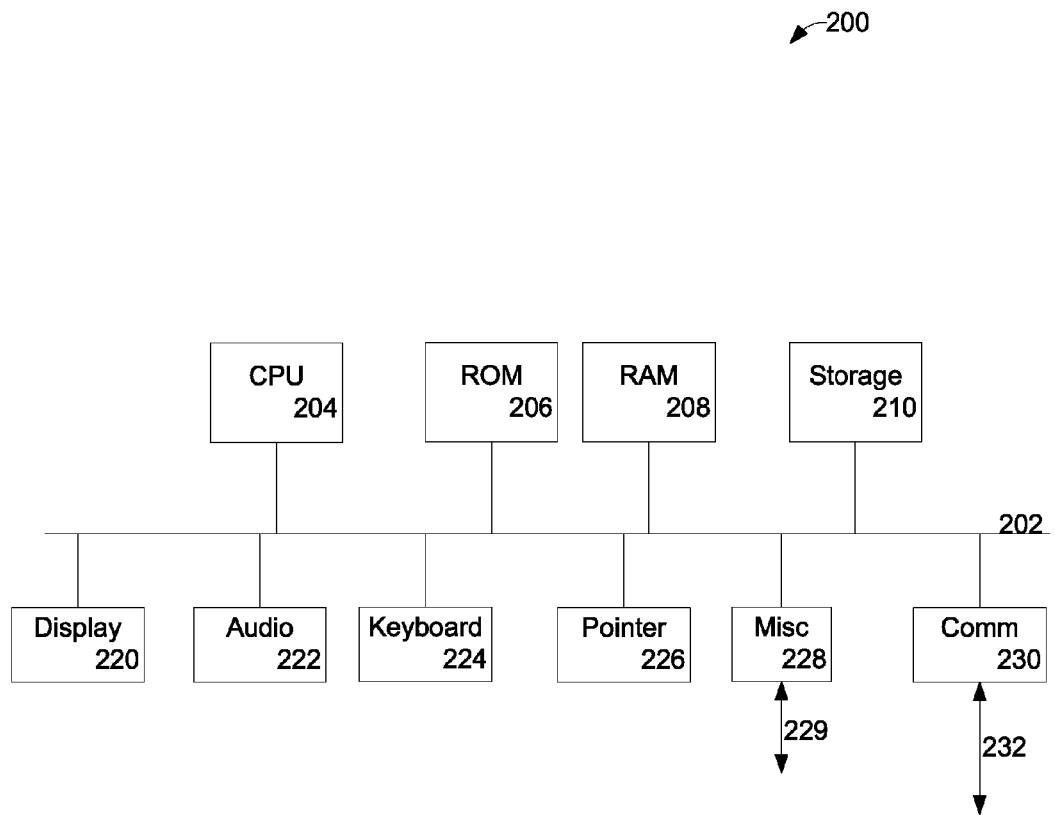
FIG. 2 is a block diagram of a computer system which may be used for implementing some embodiments of the invention.

FIG. 2 illustrates a computer system 200 in block diagram form, which may be representative of any of the clients and/or servers shown in FIG. 1, as well as, devices, clients, and servers in other Figures, and in which the techniques described may be applied. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, etc.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ) as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals capable of causing a physical excitation of matter upon reception (e.g. electrons, atoms, etc.) (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus a method and apparatus for digital I/O expander chip with multi-function timer cells have been described.

What is claimed is:

1. A timer cell comprising:
 a master counter having a clock input, a reload count input, direction input, a count output, and a rollover output;
 a count limit register having a sync control input, a rollover input, and a reload output, said count limit register reload output coupled to said master counter reload count input, said count limit register rollover input coupled to said master counter rollover output;
 a begin/end detection logic block having an output, said begin/end detection logic block output coupled to said master counter direction input;
 a one or more match registers each having a count input, each having a reload input, and each having a plurality of outputs, said one or more match registers count input coupled to said master counter count output;
 a one or more match reload registers each having a reload input, and each having an output, said one or more match reload registers each output coupled to a corresponding said one or more match register each reload input, said one or more match reload registers each reload input coupled to said master counter rollover output;
 an interrupt control logic block having a plurality of inputs and an output, said interrupt control logic block plurality of inputs coupled to said master counter rollover output and said begin/end detection logic block output and one or more of said match registers said each plurality of outputs, said interrupt control logic block output capable of generating an interrupt request;
 a status register having one or more inputs and one or more outputs, said status register one or more inputs coupled to one or more of said match registers said each plurality of outputs;
 a port register having one or more inputs, one or more I/Os (inputs/outputs), a sync control output, and a direct control input/output, said port register one or more inputs coupled to one or more of said status register one or more outputs, said port register direct control input/output capable of being coupled to a direct control logic block, said port register one or more I/Os capable of being coupled to a I/O logic block; and
 a sync control logic block having an input, a global sync input, and an output, said sync control logic block input coupled to said port register sync control output, said sync control logic block global sync input capable of receiving a global sync signal, and said sync control logic block sync control output coupled to said count limit register sync control input.

2. A device comprising a plurality of said timer cell as in claim 1 and further comprising shared interconnections between said plurality of said timer cell as in claim 1.

3. The device of claim 2 wherein said shared interconnections consists of a reset signal, a clock signal, a sync signal, and a bus.

4. The device of claim 3 wherein said shared interconnections originate from a global control.

5. The device of claim 4 further comprising a bus interface coupled to said global control and one or more of said plurality of said timer cell as in claim 1.

6. The device of claim 5 wherein said bus interface is capable of receiving a configuration information.

7. The device of claim 6 wherein said received configuration information configures said device to perform a function selected from the group consisting of parallel I/O, timer-synchronized outputs, input capture timing, pulse width measurement, pulse frequency measurement, event up/down counter, quadrature decoder, pulse width modulation, pulse position modulation, charge pump driver signal generation, and triac driver signal generation.

8. The device of claim 7 wherein said configuration for said triac driver signal generation further comprises using a single sync signal and two said timer cell as in claim 1 to create three triac drive signals.

9. The device of claim 7 wherein said configuration for said arbitrary frequency generator comprises a programmable step size and a divider value for said timer cell as in claim 1.

10. A machine-readable medium having stored thereon information representing the timer cell of claim 1.

* * * * *